(12) United States Patent
Beauregard et al.

(10) Patent No.: US 9,558,343 B2
(45) Date of Patent: Jan. 31, 2017

(54) METHODS AND SYSTEMS FOR CONTROLLING ACCESS TO RESOURCES AND PRIVILEGES PER PROCESS

(71) Applicant: BeyondTrust Software, Inc., Phoenix, AZ (US)

(72) Inventors: Peter David Beauregard, Dover, NH (US); Andrey Kolishchak, Luxembourg (LU); Shannon E. Jennings, Exeter, NH (US); Robert F. Hogan, Portsmouth, NH (US)

(73) Assignee: BeyondTrust Software, Inc., Agoura Hills, CA (US)

( * ) Notice: Subject to any disclaimer, the term of this patent is extended or adjusted under 35 U.S.C. 154(b) by 0 days.

(21) Appl. No.: 14/502,845

(22) Filed: Sep. 30, 2014

(65) Prior Publication Data

US 2015/0074828 A1    Mar. 12, 2015

Related U.S. Application Data

(63) Continuation of application No. 12/772,914, filed on May 3, 2010, now Pat. No. 8,850,549.
(Continued)

(51) Int. Cl.
*G06F 7/04* (2006.01)
*H04L 9/32* (2006.01)
(Continued)

(52) U.S. Cl.
CPC ............... *G06F 21/44* (2013.01); *G06F 9/468* (2013.01); *G06F 21/31* (2013.01); *G06F 21/604* (2013.01); *G06F 21/6209* (2013.01)

(58) Field of Classification Search
CPC ..................... G06F 21/6281; G06F 21/6227
(Continued)

(56) References Cited

U.S. PATENT DOCUMENTS 6,237,144 B1   5/2001   Delo et al.
6,308,274 B1   10/2001  Swift
(Continued)

OTHER PUBLICATIONS

Winterdom. Adjusting Process Token Privileges. 2002. http://winterdom.com. pp. 1-6.*
(Continued)

*Primary Examiner* — Dede Zecher
*Assistant Examiner* — Abdullah Almamun
(74) *Attorney, Agent, or Firm* — Hankin Patent Law, APC; Kevin Schraven; Anooj Patel

(57) ABSTRACT

To control privileges and access to resources on a per-process basis, an administrator creates a rule that may be applied to modify a token of a process. The rule may include an application-criterion set and changes to be made to the groups and/or privileges of the token. The rule may be set as a policy within a group policy object (GPO), where a GPO is associated with one or more groups of computers or users. When a GPO containing a rule is applied to a computer, a driver installed on the computer may access the rule(s) anytime a logged-on user executes a process. If the executed process satisfies the criterion set of a rule, the changes contained within the rule are made to the process token, and the user has expanded and/or contracted access and/or privileges for only that process.

24 Claims, 31 Drawing Sheets

Related U.S. Application Data

(60) Provisional application No. 61/174,513, filed on May 1, 2009.

(51) Int. Cl.

| | | |
|---|---|---|
| *G06F 21/44* | (2013.01) | |
| *G06F 9/46* | (2006.01) | |
| *G06F 21/60* | (2013.01) | |
| *G06F 21/31* | (2013.01) | |
| *G06F 21/62* | (2013.01) | |

(58) Field of Classification Search
    USPC ..... 726/9, 11, 16, 20, 21; 713/169; 709/229, 709/223
    See application file for complete search history.

(56) References Cited

U.S. PATENT DOCUMENTS

| | | |
|---|---|---|
| 6,345,386 B1 | 2/2002 | Delo et al. |
| 6,389,499 B1 | 5/2002 | Frank, Jr. et al. |
| 6,389,589 B1 | 5/2002 | Mishra et al. |
| 6,397,381 B1 | 5/2002 | Delo et al. |
| 6,412,070 B1 | 6/2002 | Van Dyke et al. |
| 6,418,554 B1 | 7/2002 | Delo et al. |
| 6,466,932 B1 | 10/2002 | Dennis et al. |
| 6,836,794 B1 | 12/2004 | Lucovsky et al. |
| 7,146,638 B2 | 12/2006 | Malcolm |
| 7,330,712 B2 | 2/2008 | Kirkup et al. |
| 7,350,204 B2 | 3/2008 | Lambert et al. |
| 7,398,532 B1 | 7/2008 | Barber et al. |
| 7,673,323 B1 | 3/2010 | Moriconi |
| 7,784,101 B2 * | 8/2010 | Verbowski et al. ............ 726/27 |
| 8,006,088 B2 | 8/2011 | Peretti |
| 8,127,316 B1 * | 2/2012 | Binotto ................... G06F 9/545 719/331 |
| 2002/0095671 A1 | 7/2002 | Delo et al. |
| 2003/0023587 A1 | 1/2003 | Dennis et al. |
| 2003/0145317 A1 | 7/2003 | Chamberlain et al. |
| 2004/0215650 A1 * | 10/2004 | Shaji ..................... H04L 41/082 |
| 2006/0248585 A1 | 11/2006 | Ward et al. |
| 2007/0043943 A1 | 2/2007 | Peretti |
| 2007/0067833 A1 | 3/2007 | Colnot |

OTHER PUBLICATIONS

Balfanz, Dirk et al., "WindowBox: A Simple Security Model for the Connected Desktop," In Proceedings of the 4th USENIX Windows Systems Symposium, pp. 37-48, Aug. 2000.

Desktop Standard Corporation, "PolicyMaker™ Software Update," 2003.

NeoValens S.A., "NeoExec for Active Directory Administrators' Guide," Version 1.0, Aug. 2004.

NeoValens, S.A., "NeoExec for Active Directory Administrators' Guide," Version 1.1, Sep. 2004.

Sullivan, Kevin, "PolicyMaker™ Features and Advantages: Maximize ROI by Managing with Standards," White Paper, Revision 1.1, 2004.

\* cited by examiner

```
Token [primary]: [S-1-5-21-2025429265-1935655697-725345543-1004] (WXP\user, user)
Source: User32 9b□ - ID 0-36239
Statistics:   ID: 0-6aca4
              AuthID: 0-3623d
              Modified ID: 0-6aca6
              Dynamic Charge: 1f4 bytes - 198 bytes free
              Session Id: 0
Owner: [S-1-5-21-2025429265-1935655697-725345543-1004] (WXP\user, user)
Primary Group: [S-1-5-21-2025429265-1935655697-725345543-513] (WXP\None, group)
acl, 2 ACEs, 0 bytes extra space
  ace: type 0x00, flags: 0x00, inheritance: 0x00, mask: 0x10000000, sid: [S-1-5-21-
2025429265-1935655697-725345543-1004] (WXP\user, user)
  ace: type 0x00, flags: 0x00, inheritance: 0x00, mask: 0x10000000, sid: [S-1-5-18] (NT AU-
THORITY\SYSTEM)

Groups in token [6]:
[S-1-5-21-2025429265-1935655697-725345543-513]
    SE_GROUP_MANDATORY
    SE_GROUP_ENABLED_BY_DEFAULT
    SE_GROUP_ENABLED
[S-1-1-0]
    SE_GROUP_MANDATORY
    SE_GROUP_ENABLED_BY_DEFAULT
    SE_GROUP_ENABLED
[S-1-5-32-545]
    SE_GROUP_MANDATORY
    SE_GROUP_ENABLED_BY_DEFAULT
    SE_GROUP_ENABLED
[S-1-5-5-0-221640]
    SE_GROUP_MANDATORY
    SE_GROUP_ENABLED_BY_DEFAULT
    SE_GROUP_ENABLED
[S-1-2-0]
    SE_GROUP_MANDATORY
    SE_GROUP_ENABLED_BY_DEFAULT
    SE_GROUP_ENABLED
[S-1-5-4]
    SE_GROUP_MANDATORY
    SE_GROUP_ENABLED_BY_DEFAULT
    SE_GROUP_ENABLED Restricted SIDs:
Token Privileges:
Privilege: 17, SeChangeNotifyPrivilege (Bypass traverse checking), state: enabled
Privilege: 13, SeShutdownPrivilege (Shut down the system), state: disabled
Privilege: 19, SeUndockPrivilege (Remove computer from docking station), state: enabled
```

FIG. 1

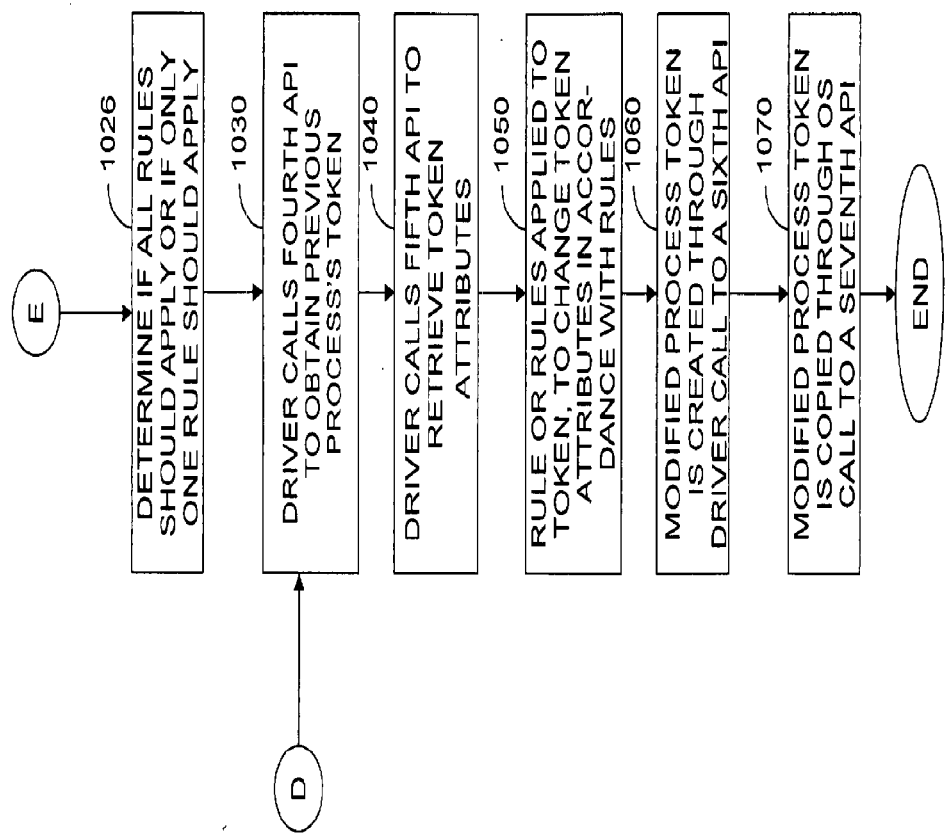

METHODS AND SYSTEMS FOR CONTROLLING ACCESS TO RESOURCES AND PRIVILEGES PER PROCESS

CROSS-REFERENCE TO RELATED APPLICATION

The present application is a continuation of U.S. Nonprovisional application Ser. No. 12/772,914, filed May 3, 2010, entitled "Methods and Systems for Controlling Access to Resources and Privileges per Process" which claims benefit of U.S. Provisional Patent Application No. 61/174,513 filed May 1, 2009, and entitled "Methods and Systems for Modifying the Integrity Level of an Application" which are both incorporated herein by reference.

BACKGROUND OF THE INVENTION

Field of the Invention

The disclosed methods and systems related generally to securing resources and privileges on a computer, and more particularly to controlling access to resources and controlling privileges per process.

Background Information

A user logs on to a computer locally by giving his user name and password to the operating system ("OS"). The OS then creates a logon session and an access token for that user. The access token includes a unique identifier (i.e., known as a security ID ("SID") for the logged-on user), a list of privileges the user has or the user's groups has, and a list of all the groups to which the user, as identified by his/her unique SID, belongs. Each group is also identified by a unique SID. For each process that is created during the logon session, the OS assigns a copy of the original access token to that process. A token assigned to a process is a process token. An example of a process token is shown in FIG. 1.

A user's membership in different groups determines what securable objects the user is able to access, presuming the object allows members of that group access. A securable object includes, but is not limited to, a file, process, event, or anything else having a security descriptor. For example, a user will not be able to access a securable object if access to that securable object, is limited to a group of which the user is not a member. Similarly, a user's privileges are limited to those associated with the access token.

Whenever a process tries to access a securable object, the OS performs an access check. The OS compares the process token to an access control list ("ACL") of the securable object. An access control list is a list of security protections that applies to the securable object. An entry in an ACL is known as an access control entry ("ACE"). An ACE contains a set of access rights, such as read/write, etc., and a SID that identifies a group and/or user for whom the rights are allowed, denied, or audited. If the SID in the process token matches an SID in the ACL of the securable object, and if the ACE (for that SID) rights are set to "allow," then the process associated with the process token will be able to access the securable object. Otherwise, the process will be denied access to the securable object.

Access to the securable object may also be denied if, for example, within the ACE of that SID, rights are set to "deny," even if the process token contains a copy of the SID that is in the securable object's ACL.

It is also possible that some privileges instruct the OS to bypass the securable object's ACL. Under such a security arrangement, each process created by the OS in response to a given process's request therefore has the same token as the requesting process, and thus share the same access to securable objects and privileges.

Situations may arise, however, where, in order to perform a task, a user needs access to securable objects and/or privileges that are outside the scope of his current group membership and/or privileges listed in the user's access token. One solution to this problem is to make the user a member of a group that has expanded access and/or privileges, such as the Administrators Group in a Windows-brand OS. This solution may have unintended consequences, as the user gains not only the needed access and/or privilege(s), but greater access and other privileges as well. Making the user a member of the Administrators Group enables the user to access the particular needed object, but may also enable the user to install unauthorized applications, perform unauthorized modifications to the configuration of their computer, and so on. Potentially even more importantly, users with elevated privileges and access are more vulnerable to malware (e.g., viruses, trojans, worms, and the like) which may threaten the user's computer, the user's account, shared accounts, and the network. Thus, a means of granting only needed access and/or privileges is desirable.

In MICROSOFT™ WINDOWS™, a Group Policy Object (GPO) is a collection or grouping of configuration settings that are applied to computers automatically. Group Policy is a MICROSOFT™ implementation of the general concept of policy-based management, which is a computer management model. One potential implementation of a group policy system is described in U.S. Pat. No. 6,466,932. By applying the configuration settings to the computers, a system administrator or other entity may define and set the behavior and appearance or configuration of the computers. Accordingly, a GPO is generally configured by a system administrator or other high-level administrator, and as an object, a GPO can be associated with a hierarchical grouping known as a "container." A container may be a domain, a site, an organization unit (OU), or other association of computers, systems, or users. In some example instances, a GPO may define script options, security options, software-installation options, folder-redirection options, software-maintenance options, and other configuration options.

Each GPO has a list that controls whether the GPO's settings are applied to given users, groups, and/or computers. An entity that is on the list has the GPO's settings applied to it. An entity not on the list does not have the GPO's settings applied to it. The use of groups, as opposed to user or computer identities, as the criterion on which the settings application decision is made may be referred to as GPO-level filtering. Accordingly, GPO-level filtering allows a system administrator to specify whether a GPO is applied or denied to users or computers. The GPO is thus applied in its entirety, or denied in its entirety, to a user, computer, or system.

In a MICROSOFT™ implementation, GPOs are populated with settings by a Group Policy Object Editor (GPOE). Settings are applied on client computers by corresponding extensions, called Client-Side Extensions (CSEs). There is a documented extension model that MICROSOFT™ provides for software vendors to extend these systems and, by doing so, provide new functionality within the WINDOWS™ Group Policy architecture.

SUMMARY OF THE INVENTION

In various embodiments, there is provided, for modifying access to securable objects, a method including providing a rule that includes an application-criterion set which includes at least one criterion for token modification in accordance with the rule. The rule may specify at least one group to be added to a token of a process that satisfies the application-criterion set and whose access to securable objects is controlled by an operating system in accordance with the token. At least one of said specified group may be a group other than the Administrators Group. Before the operating system employs a process's token to determine that process's access to securable objects, the method may comprise making a determination of whether that process satisfies the criterion set, and, if that determination is affirmative, adding to that process's token in response to that rule each group that the rule specifies. In some embodiments, the addition only occurs if and only if that determination is affirmative.

The rule may be one of a plurality of such rules. In some embodiments, the method may include assigning relative priorities to the rules. Further, the method may include adding a group to the process's token in response to a given rule only if the process satisfies the application-criterion set of no rule whose priority is higher than the given rule's. The rule may be any kind of rule, including, but not limited to a path rule, a hash rule, a folder rule, an MSI path/folder rule, a shell rule, a certificate rule, an ActiveX rule, or a CD/DVD rule.

The process may execute an executable entity. In some embodiments, at least one said criterion may be that the executable entity match an executable-entity identifier specified by that criterion. The executable entity may be an executable file. Further, the executable-entity identifier may be a hash on the executable file's contents. In various embodiments, the executable-entity identifier may represent the executable file's path. The executable-entity may be a CD/DVD or an Active X-related application. The executable-entity identifier may be a certificate.

The rule may further specify at least one privilege to be added to the token of a process that satisfies the application-criterion set. Further, the method may include adding each privilege that the rule specifies to a process token if the process satisfies the application-criterion set.

In some embodiments, the rule may further include an inheritance option set to either block or allow inheritance by any child process of any group or groups added to the token of a parent process. If the inheritance option is set to "block" and the process does not satisfy any of said rule's application-criterion set, the method may further include determining if the process is the child of another process and if the process is the grandchild of another process, and if both determinations are affirmative, make that process token the same as the token as its grandparent process, and if not, make that process token the same as an unmodified access token.

One said criterion may be that the user match a user identifier specified by that criterion. The user identifier may be a user authentication, such as a password, a biometric scan, and the like. Another criterion may be that the user provide a justification for modifying access to the securable object.

An exemplary method for modifying a user's privileges to perform systems-related operations comprises providing a rule that includes an application-criterion set which includes at least one criterion for token modification in accordance with the rule, the rule specifying at least one privilege to be added to a token of a process that satisfies the application-criterion set and whose performance of system operations is controlled by an operating system in accordance with the token. The method may further comprise, before the operating system employs a process's token to determine that process's privileges, making a determination of whether that process satisfies the criterion set, and if that determination is affirmative, adding to that process's token in response to that rule each privilege that the rule specifies. In some embodiments, the addition only occurs if and only if the determination is affirmative.

In some embodiments, the rule may further specify at least one group to be added to the token of a process that satisfies the application-criterion set. Further, the method may further include adding each group that the rule specifies to the process token if the process satisfies the application-criterion set.

The rule may also further include an inheritance option set to either "block" or "allow" inheritance by any child process, of any privilege or privileges added to the token of a parent process. If the inheritance option is set to "block" and the process does not satisfy any of said rule's application-criterion set, the method may further include determining if the process is the child of another process and if the process is the grandchild of another process, and if both determinations are affirmative, make that process token the same as the token as its grandparent process, and if not, make that process token the same as an unmodified access token.

One said criterion may be that the user match a user identifier specified by that criterion.

An exemplary method for blocking inheritance of a modified token of a process comprises providing at least one rule that includes an application-criterion set including at least one criterion for token modification in accordance with the rule, the rule specifying (1) at least one change to be made to a token of a process that satisfies the application-criterion set and whose privileges and access to securable objects are controlled by an operating system in accordance with the token, and (2) an inheritance option set to either block or allow inheritance, by any child process, of any changes made to the token of a parent process. The method may further comprise, if the inheritance option is set to block and the process does not satisfy any said rule's application-criterion set, determining if the process is the child of another process. This determination may occur before the operating system of the computer employs a process's token to determine that process's privileges and access to securable objects. If the process is the grandchild of another process, and if both determinations are affirmative, the method may comprise making that process's token the same as the token of its grandparent process. If the process is not a grandchild of another process, the method may comprise making that process's token the same as an unmodified access token.

The at least one change may be one of adding a group, removing a group, adding a privilege, and removing a privilege. The process may execute an executable entity. At least one said criterion may be that the executable entity match an executable-entity identifier specified by that criterion. One said criterion may be that the user match a user identifier specified by that criterion.

An exemplary method for limiting changes made to a token of a process may comprise providing a rule that includes an application-criterion set including at least one criterion for token modification in accordance with the rule, wherein one said criterion is that the user match a user identifier specified by that criterion, the rule specifying at least one change to be made to a token of a process that satisfies the application-criterion set and whose access to securable objects and privileges is controlled by an operating system in accordance with the token. Before the operating system employs a process's token, the method may further comprise determining that process's access to securable objects and privileges by making a determination of whether that process satisfies the criterion set, and if that determination is affirmative, changing that process's token in response to that rule according to each change that the rule specifies. In some embodiments, the changing occurs if and only if the determination is affirmative.

The at least one change may be one of adding a group, removing a group, adding a privilege, and removing a privilege. The rule may be one of a plurality of such rules. The method may further comprise assigning relative priorities to the rules and/or changing the process's token in response to a given rule only if the process satisfies the application-criterion set of no rule whose priority is higher than the given rule's. The method may further comprise executing an executable entity. At least one said criterion may further include that the executable entity match an executable-entity identifier specified by that criterion.

An exemplary method for managing, over a network, changes to process tokens created in computers operatively coupled to the network, where the computers on the network are organized into groups, comprises creating a rule that includes an application-criterion set including at least one criterion for token modification in accordance with the rule, the rule specifying at least one change to be made to a token of a process that satisfies the application-criterion set and whose access to securable objects and privileges is controlled by an operating system in accordance with the token, associating each created rule to respective selected ones of group policy objects, where at least one selected group policy object applies to at least one of the groups of computers, applying each group policy object to its group of computers, and for each computer in each group, before the operating system of that computer employs a process's token to determine that process's access to securable objects and privileges, making a determination of whether that process satisfies the criterion set, and if and only if that determination is affirmative, changing that process's token in response to that rule according to each change that the rule specifies.

One said criterion may be that the user match a user identifier specified by that criterion. The method may further include adding, in response to user input, at least one user-defined filter criterion to a selected group policy object. Applying each group policy object to its group of computers may further include applying each group policy object to each computer in its associated group of computers if that computer satisfies the user-defined filter criterion. The at least one user-defined criterion may include at least one user identifier.

An exemplary computer readable medium may comprise executable instructions to perform a method to modify access to securable objects on a computer, the method comprising receiving a rule that includes an application-criterion set including at least one criterion for token modification in accordance with the rule, the rule specifying at least one group to be added to a token of a process that satisfies the application-criterion set and whose access to securable objects is controlled by an operating system of the computer in accordance with the token, at least one said specified group being a group other than the Administrators Group, and before the operating system of the computer employs a process's token to determine that process's access to securable objects, making a determination of whether that process satisfies the criterion set, and if and only if that determination is affirmative, adding to that process's token in response to that rule each group that the rule specifies.

Another exemplary computer readable medium may comprise executable instructions to perform a method to modify a user's privileges to perform systems-related operations on a computer, the method may comprise receiving a rule that includes an application-criterion set including at least one criterion for token modification in accordance with the rule, the rule specifying at least one privilege to be added to a token of a process that satisfies the application-criterion set and whose performance of system operations is controlled by an operating system of the computer in accordance with the token, and before the operating system of the computer employs a process's token to determine that process's privileges, making a determination of whether that process satisfies the criterion set, and if and only if that determination is affirmative, adding to that process's token in response to that rule each privilege that the rule specifies.

Yet another exemplary computer readable medium may comprise executable instructions to perform a method to block inheritance of a modified token of a process on a computer, the method comprising receiving at least one rule that includes an application-criterion set including at least one criterion for token modification in accordance with the rule, the rule specifying (1) at least one change to be made to a token of a process that satisfies the application-criterion set and whose privileges and access to securable objects are controlled by an operating system of the computer in accordance with the token, and (2) an inheritance option set to either block or allow inheritance, by any child process, of any changes made to the token of a parent process, and if the inheritance option is set to block and the process does not satisfy any said rule's application-criterion set, before the operating system of the computer employs a process's token to determine that process's privileges and access to securable objects, determining if the process is the child of another process and if the process is the grandchild of another process, and if both determinations are affirmative, making that process's token the same as the token of its grandparent process, and if not, make that process's token the same as an unmodified access token.

In some embodiments, an exemplary computer readable medium may comprise executable instructions to perform a method to limit changes made to a token of a process on a computer, the method may comprise receiving a rule that includes an application-criterion set including at least one criterion for token modification in accordance with the rule, wherein one said criterion is that the user match a user identifier specified by that criterion, the rule specifying at least one change to be made to a token of a process that satisfies the application-criterion set and whose access to securable objects and privileges is controlled by an operating system in accordance with the token, and before the operating system employs a process's token to determine that process's access to securable objects and privileges, making a determination of whether that process satisfies the criterion set, and if and only if that determination is affirmative, changing that process's token in response to that rule according to each change that the rule specifies. The user identifier may be a password, a biometric scan, and the like.

In another embodiment, there is provided a computer program product to manage, over a network, changes to process tokens created in computers operatively coupled to the network, where the computers on the network are organized into groups, the computer program product comprising computer code to: create a rule that includes an application-criterion set including at least one criterion for token modification in accordance with the rule, the rule specifying at least one change to be made to a token of a process that satisfies the application-criterion set and whose access to securable objects and privileges is controlled by an operating system in accordance with the token, associating each created rule to respective selected ones of group policy objects, where at least one selected group policy object applies to at least one of the groups of computers, applying each group policy object to its group of computers; and for each computer in each group, before the operating system of that computer employs a process's token to determine that process's access to securable objects and privileges, making a determination of whether that process satisfies the criterion set, and if and only if that determination is affirmative, changing that process's token in response to that rule according to each change that the rule specifies.

In various embodiments, an exemplary computer readable medium may comprise executable instructions to perform a method to modify a user's privileges to perform systems-related operations on a computer, the method comprising configuring a token for a process the user may execute, wherein the token relates to a level of access to a systems-related operation, and before the operating system of the computer executes a systems-related operation, accessing the user's token to determine that the user's privileges include executing the system-related operation.

In some embodiments, An exemplary computer readable medium may comprise executable instructions to perform a method to set an integrity level for at least one indicated process, wherein setting the integrity level of the at least one process does not modify the integrity level of any other non-indicated process and before the operating system of the computer executes the at least one process, accessing the integrity level indication to determine under what integrity level to execute the process.

The method may further comprise verifying the identity of a user requesting that the integrity level be set and/or prior to setting the integrity level, requesting a justification from a user requesting that the integrity level be set. Setting the integrity level may be done in accordance with at least one rule. The at least one rule may be a shell rule, wherein the integrity level is set for an individual process upon user on-demand request. The at least one rule may be a certificate rule, wherein the integrity level is set if at least one criteria of the process' certificate is met. The at least one rule may be an administrator-defined rule, wherein the integrity level is set upon providing a user credential. The at least one rule may be an external media and memory rule, wherein the integrity level is set for all processes executed from an indicated external media or memory. The Integrity Level may also be set for path, hash, folder, MSI path, MSI folder, and ActiveX rules. The method may also comprise logging of the execution that is generated when the operating system of the computer executes the at least one process.

In various embodiments, an exemplary computer readable medium may comprise executable instructions to perform a method to modify a user's or group of users' access to a process on a computer, the method may comprise determining if one or more rules apply to a process that a user or group of users executes, configuring a token for the process, wherein the token relates to a level of access to the process in accordance with an applicable rule, and before the computer executes the process, accessing the process' token to determine at least one of a permission, a privilege, and an integrity level with which to execute the process. In some embodiments, the method may apply the rule only if a user can authenticate or if the process is owned by an Administrators Group. The method may further comprise applying the rule to all processes launched by a specified application.

Further, the method may further comprise applying the rule to all programs in all subfolders of a specified folder. The method may require the user to enter a justification prior to configuring the token.

BRIEF DESCRIPTION OF THE DRAWINGS

The description below refers to the accompanying drawings, of which:

FIG. 1 is an example of the contents of a process token.

FIGS. 11A-11D are exemplary flowcharts showing how a local digital device may applies the rule(s) it receives as policies to processes as they execute on the local digital device in some embodiments.

FIG. 12 shows an exemplary unmodified process token containing a user's SID and the SIDs of the group that user is a member of.

DETAILED DESCRIPTION

To provide an overall understanding, certain illustrative embodiments will now be described. It will be understood by one of ordinary skill in the art, however, that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems or methods. Additionally, the shapes and sizes of components are also exemplary and unless otherwise specified, may be altered without affecting the scope of the disclosed and exemplary systems or methods of the present disclosure.

Some embodiments as described below allow an administrator of a computer network to set privileges and access to securable objects on a per-process basis, thereby creating a more secure, manageable environment. Some embodiments may use a group/policy management system, such as WINDOWS™ GPO management. The disclosed methods and systems, however, are not limited to such an example embodiment. As such, the disclosed methods and systems may be understood to apply to other group and/or policy-based management systems and techniques.

Figure 2:
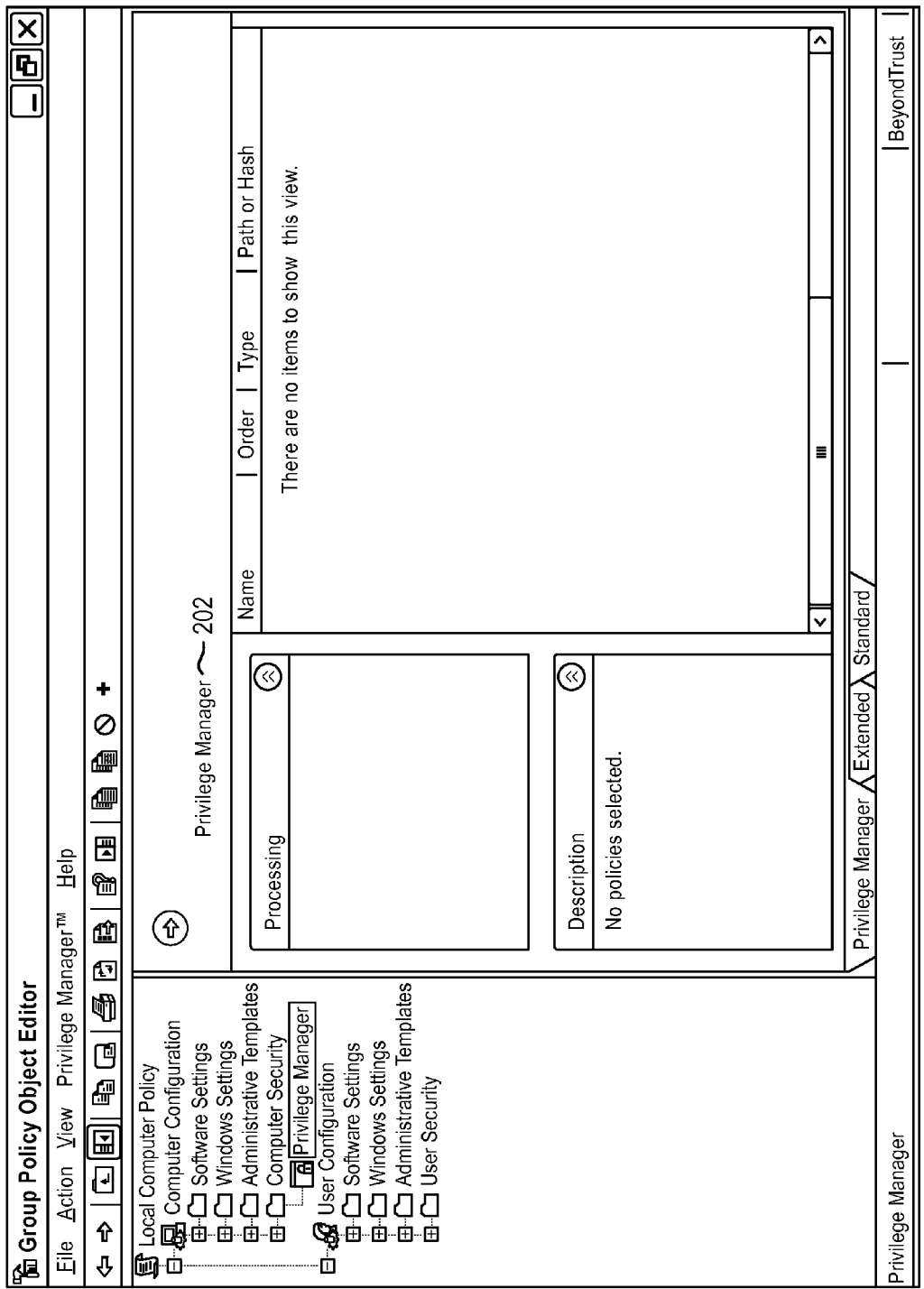
FIG. 2 is a graphical user interface of an exemplary security management system described herein including a privilege manager tab, through which rules may be created, edited, and/or deleted.

FIG. 2 shows a graphical user interface of an exemplary security management system described herein, including a privilege manager tab 202, through which rules may be created, edited, and/or deleted. Before creating a rule or rules to be used in modifying process tokens, the administrator or other user may select a policy object to add policies to, remove policies from, or modify the existing policies of. Subsequently, the user may create one or more rules that a digital device may use to modify the token of a process (e.g., a process token), to edit one or more existing rules, or delete one or more existing rules. A digital device is any device that has a processor and memory. Examples of digital devices include, but are not limited to, laptops, computers, servers, personal digital assistants, smartphones, mobile devices, media devices, tablets, and the like.

Figure 3:
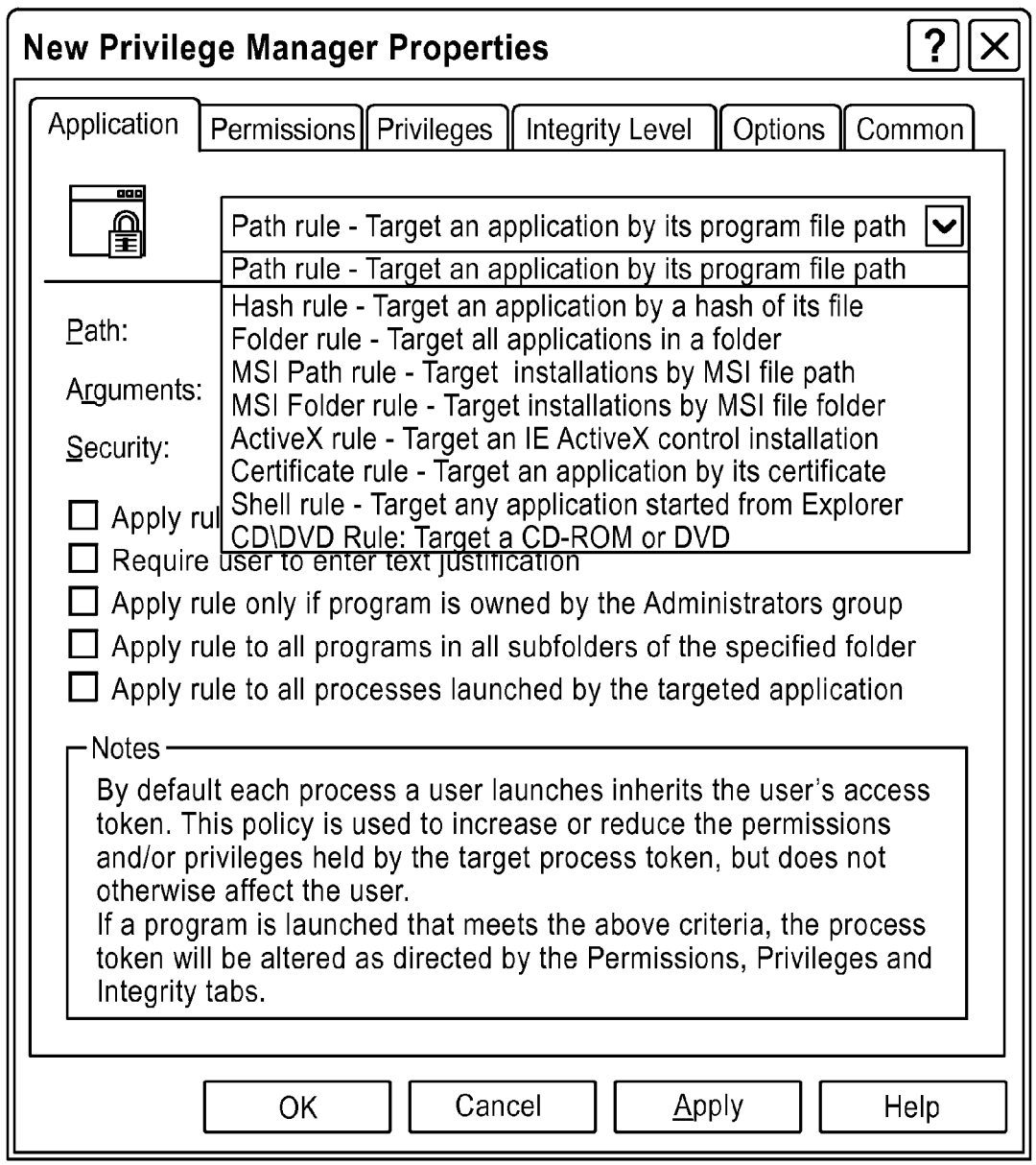
FIG. 3 is a graphical user interface for selecting the type of rule in some embodiments.

A rule may identify one or more processes to be applied. The user may select a rule for identifying a process. In some examples, a process may be identified by a hash rule, a path rule, a folder rule, an MSI Path rule, an MSI folder rule, an ActiveX rule, a certificate rule, a shell rule, or a CD/DVD rule, as shown in FIG. 3. FIG. 3 is a graphical user interface for selecting a type of rule in some embodiments.

A hash rule uses a hashing function, such as but not limited to the SHA-1 hashing function, to calculate a unique identifier of a process. The calculation may be performed on the binary file of the process. In one example, the identifier is a 20 byte ID, though any size identifier may be used. A hash rule may enable targeting an application by a hash of its file. The hash rule may be independent of the file location, but, in some embodiments, the hash rule may be updated (e.g., a new hash is calculated) whenever a new image of the file is deployed. A hash rule may be applied to only one executable file at the time. In other embodiments, a hash rule may be applied to any number of executable files at a time.

A path rule allows the user to identify one or more processes by means of a file name and/or path. The file name and/or path may include wildcards, keywords, and/or subdirectories. A path rule may apply to a number of processes that are subject to frequent changes and/or processes that execute code stored in a location under the control of the user. In one example, processes may execute code stored in a network share. A path rule may enable targeting an application by a program file hash.

A folder rule may enable targeting of applications in a folder. An MSI Path rule may enable targeting installations by MSI path. An MSI Folder rule may enable targeting installations by MSI file folder. An ActiveX rule may enable targeting an IE ActiveX control installation. A certificate rule may enable targeting an application by its certificate. A shell rule may enable targeting an application started from Explorer. A CD/DVD rule may enable targeting a CD-ROM or DVD.

In various embodiments, by default, each process a user launches inherits the user's access token. This policy may be used to increase or reduce the permissions and/or privileges held by the target process token, but may not otherwise affect the user. If a program is launched that meets selected criteria, the process token may be altered as directed by the permissions, privileges, and/or integrity tabs.

Figure 4A:
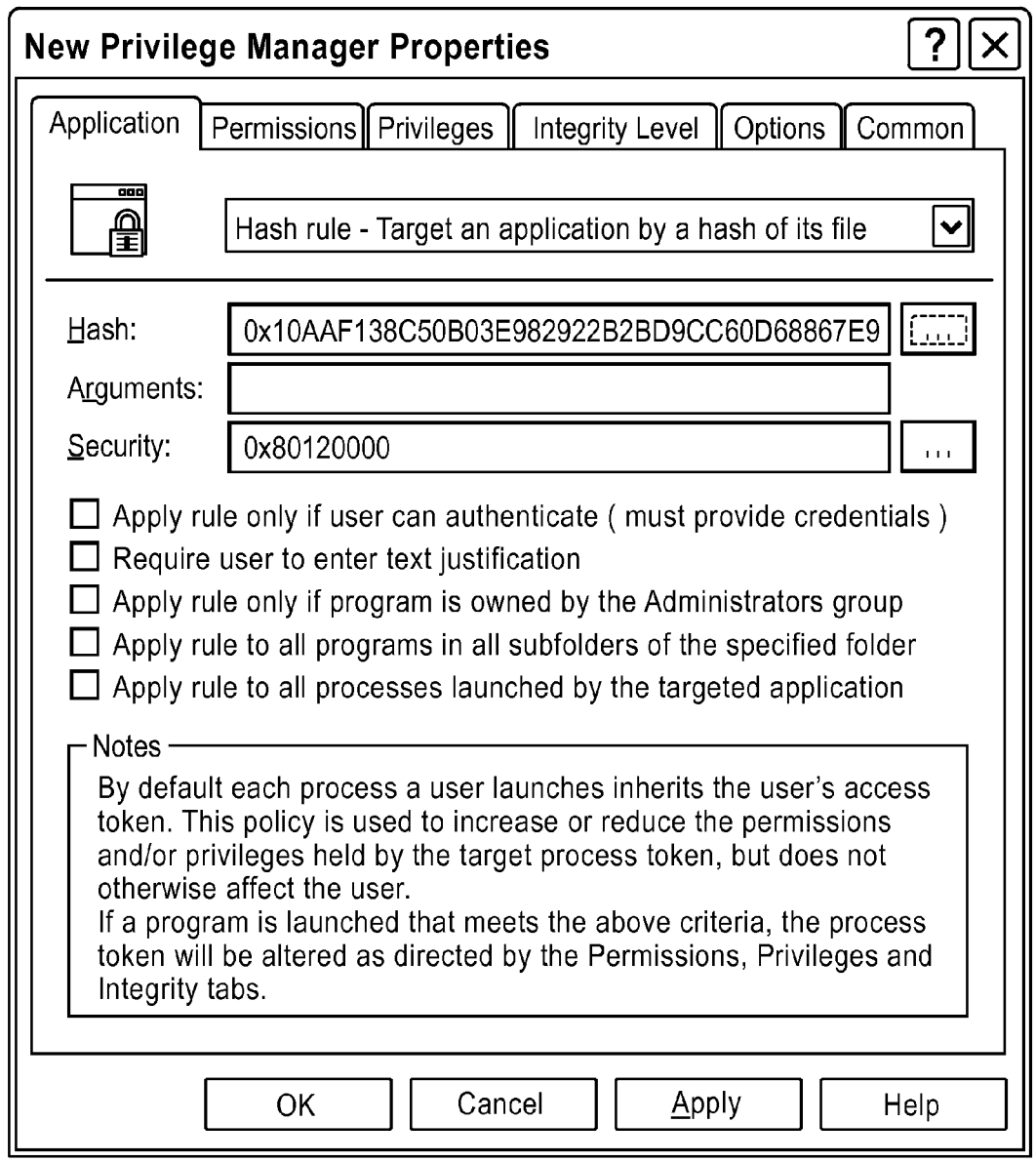
FIGS. 4A and 4B are respective graphical user interfaces for selecting processes to which a rule applies, according to type of rule chosen in some embodiments.
Figure 4B:
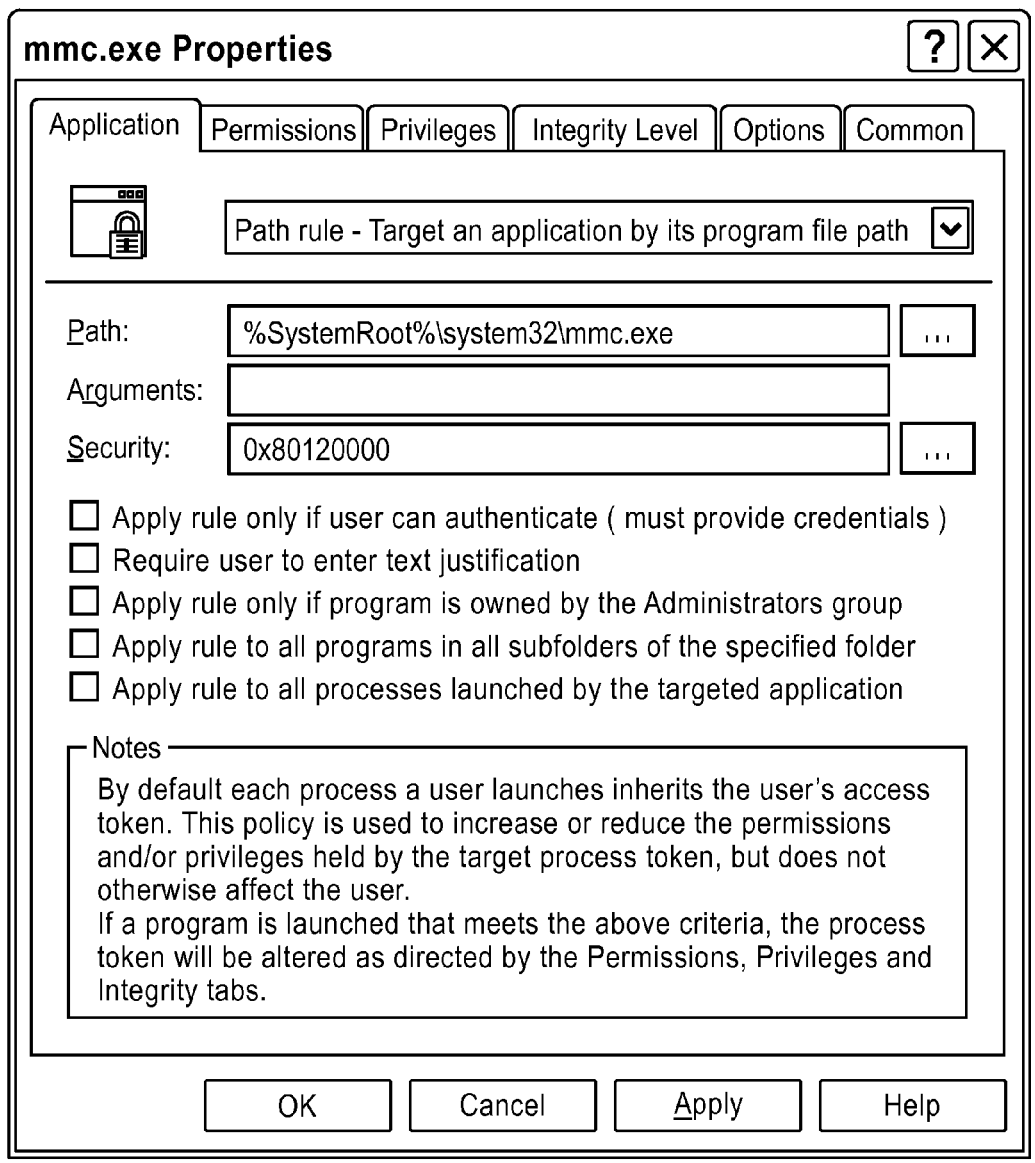

After the rule type is chosen, the processes that the rule will apply to are chosen. One or more processes may be chosen, as shown in the graphical user interfaces of FIGS. 4A and 4B. FIGS. 4A and 4B are respective graphical user interfaces for selecting processes to which a rule applies, according to type of rule chosen in some embodiments. For the path rule, it is possible to have the rule apply recursively by selecting the "Apply rule to all processes launched by the targeted application" option.

Figure 5:
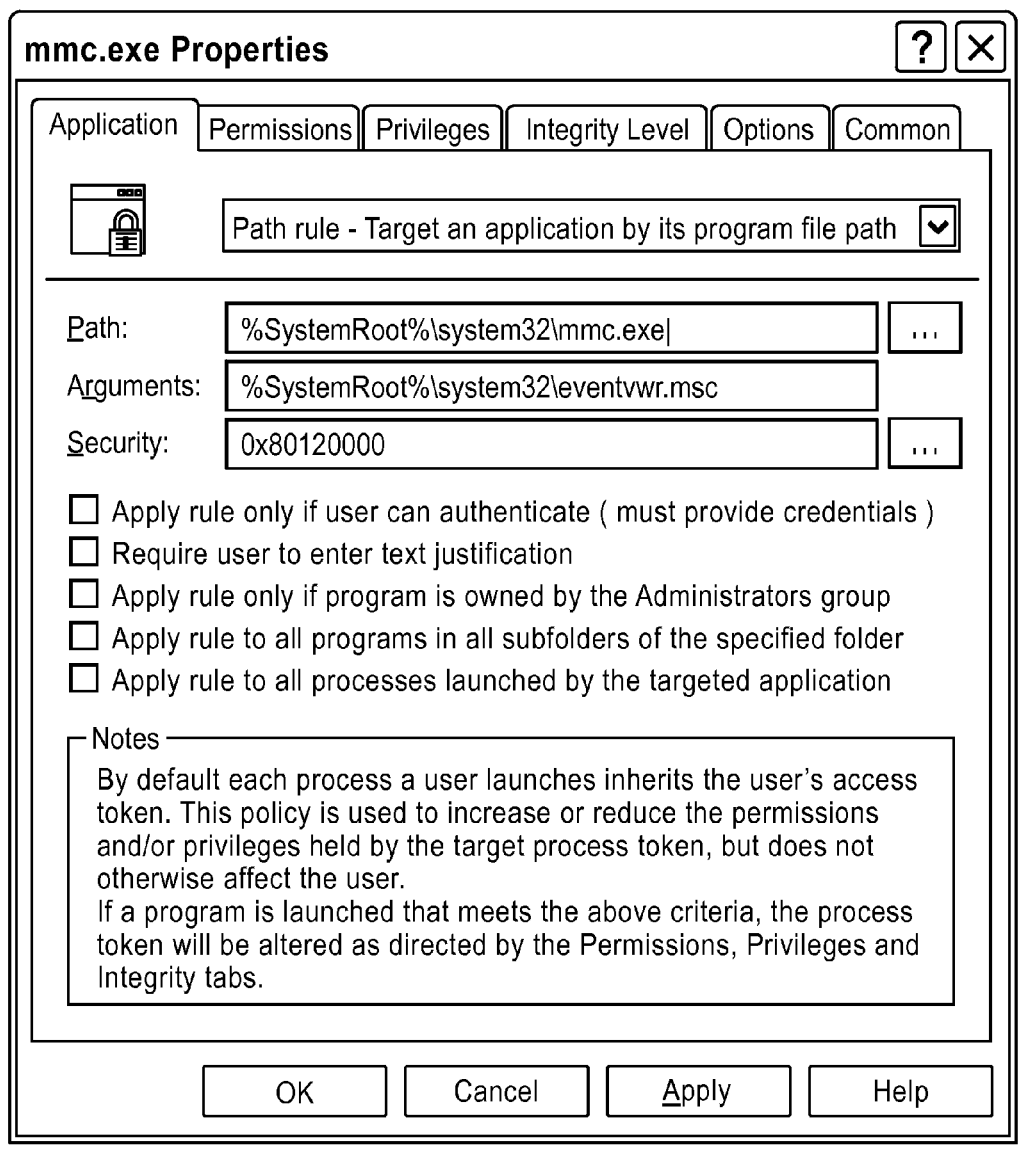
FIG. 5 is a graphical user interface for optionally limiting a rule to apply only if a particular command line of a process is used in some embodiments.

As an option, the user may wish to restrict the execution of certain processes so that they may be launched only if a specific command line argument is used, as shown in FIG. 5. FIG. 5 is a graphical user interface for optionally limiting a rule to apply only if a particular command line of a process is used in some embodiments. For example, in a Windows-based OS, all Control Panel applets are either .cpl extensions executed by rundll32 or shortcuts to administrative Microsoft Management Console snap-ins executed by mmc.exe. As it is potentially unsafe to grant end users unrestricted access to those applications, the execution of such processes may be limited to occur only when invoked with particular command line arguments. After being selected, particular command lines may be added, deleted, or edited.

The administrator or other user may subsequently select what change or changes the rule will make to the token of each identified process. A change may be one or more of: adding a group or groups to the token, removing a group or groups from the token, adding a privilege, privileges, or permission to, or changing the integrity level of the token, and removing a privilege, privileges, or permission from, or changing the integrity level of the token.

Figure 6:
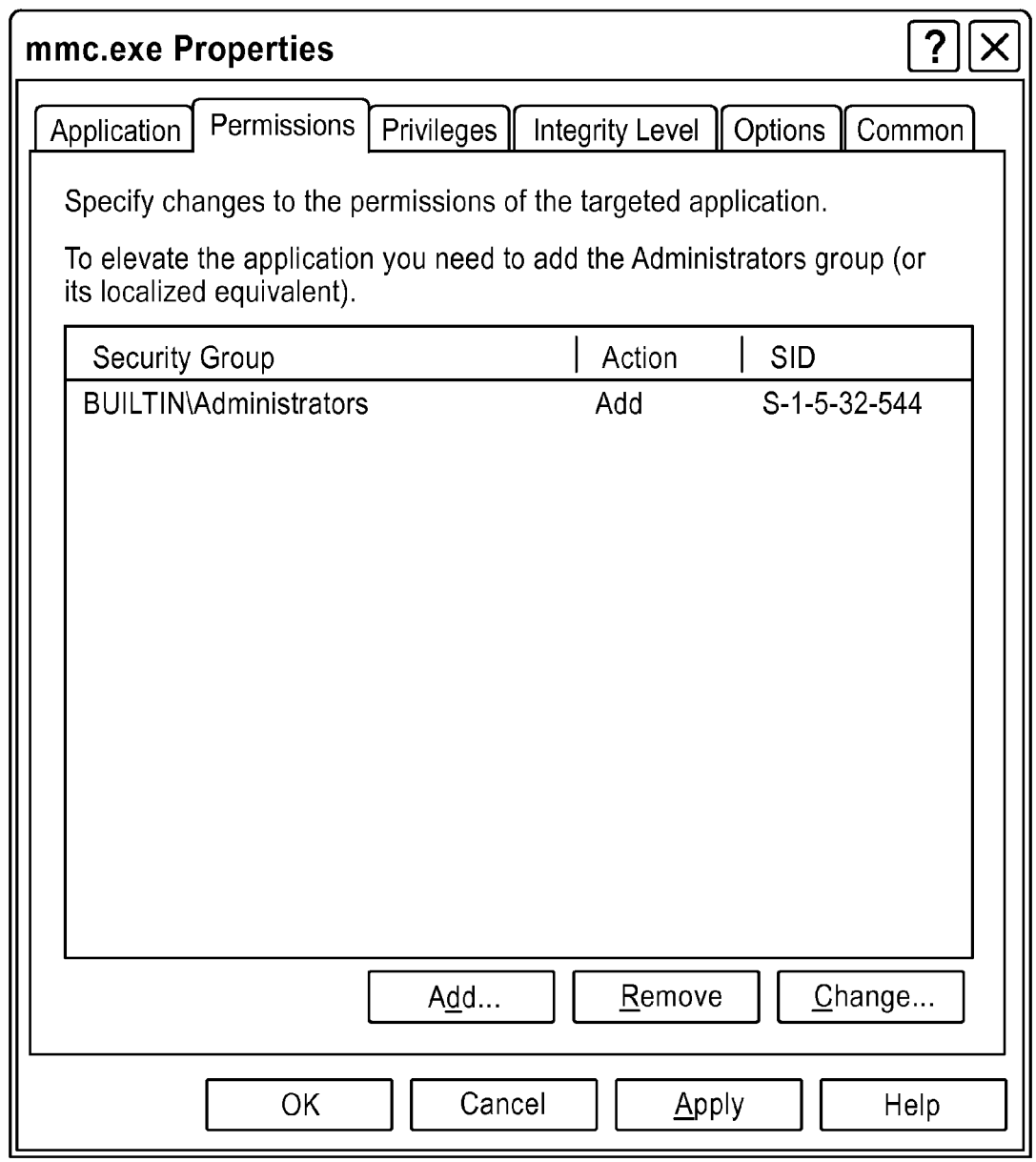
FIG. 6 is a graphical user interface for adding one or more groups to the rule in some embodiments.
Figure 7:
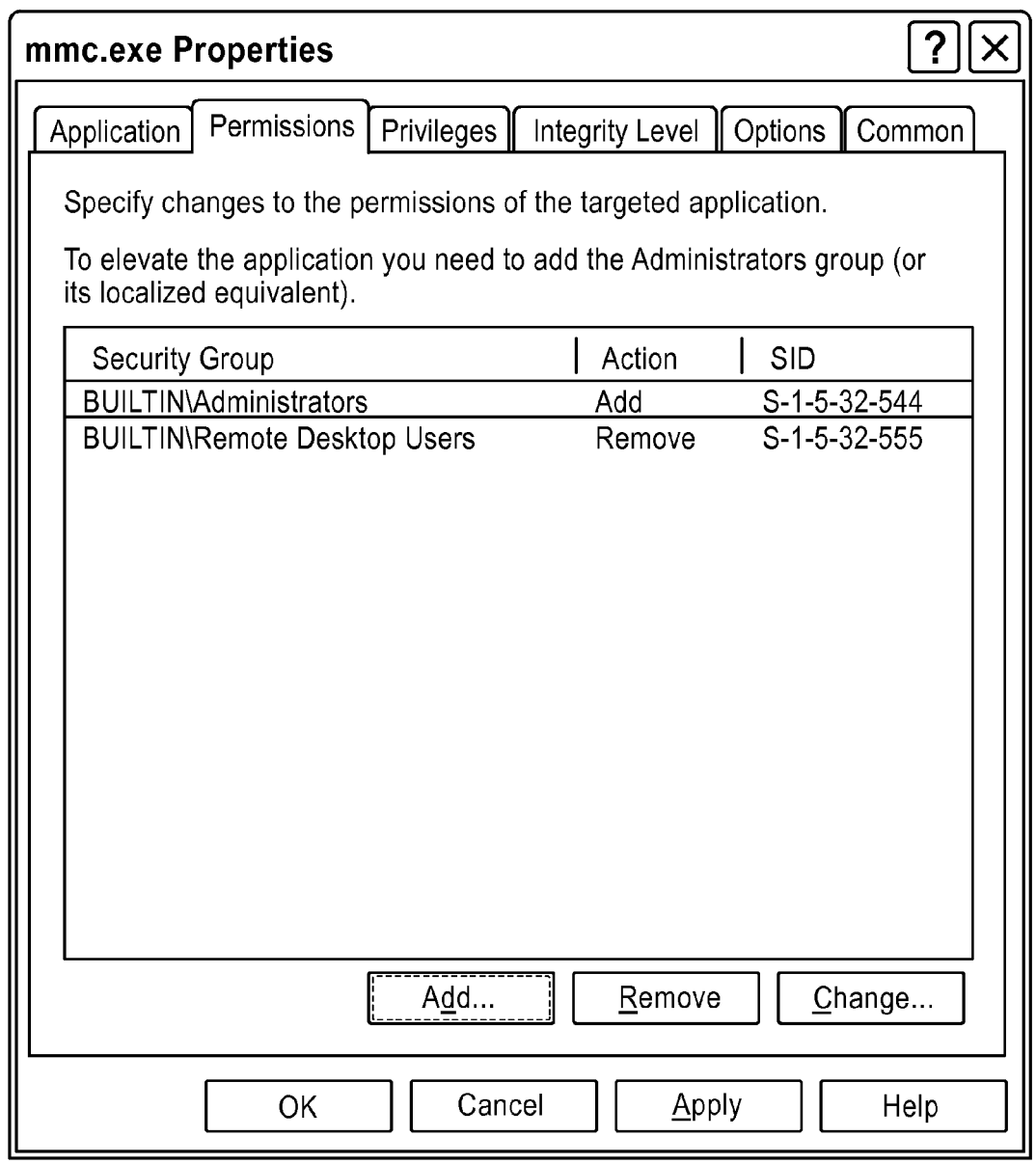
FIG. 7 is a graphical user interface for removing one or more groups from the rule in some embodiments.
Figure 8:
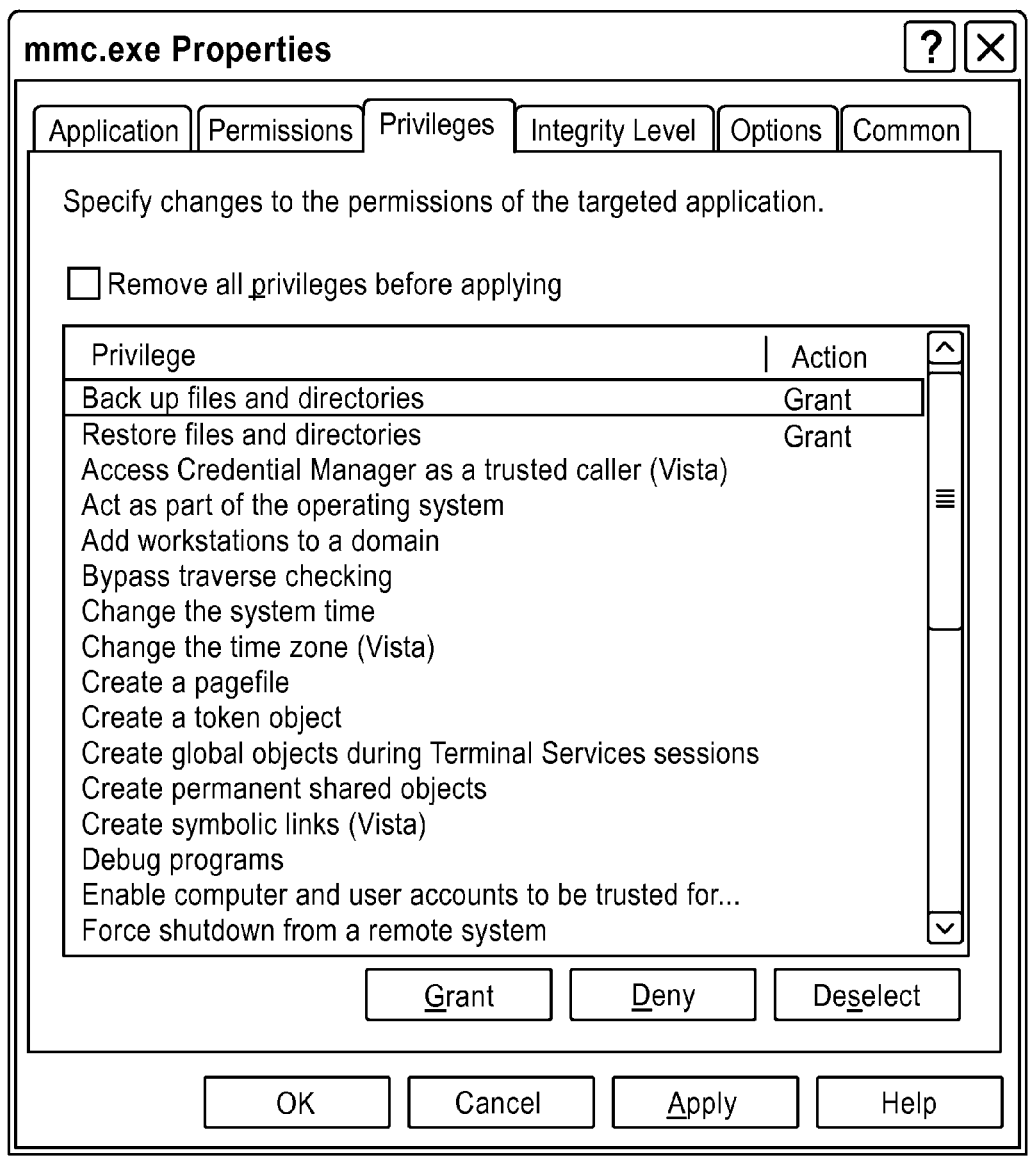
FIG. 8 is a graphical user interface for adding and/or removing one or more privileges from the rule or changing the integrity level of the token in some embodiments.

FIG. 6 is a graphical user interface for adding one or more groups to the rule in some embodiments. FIG. 7 is a graphical user interface for removing one or more groups from the rule in some embodiments. FIG. 8 is a graphical user interface for adding and/or removing one or more privileges from the rule or changing the integrity level of the token in some embodiments.

Figure 9:
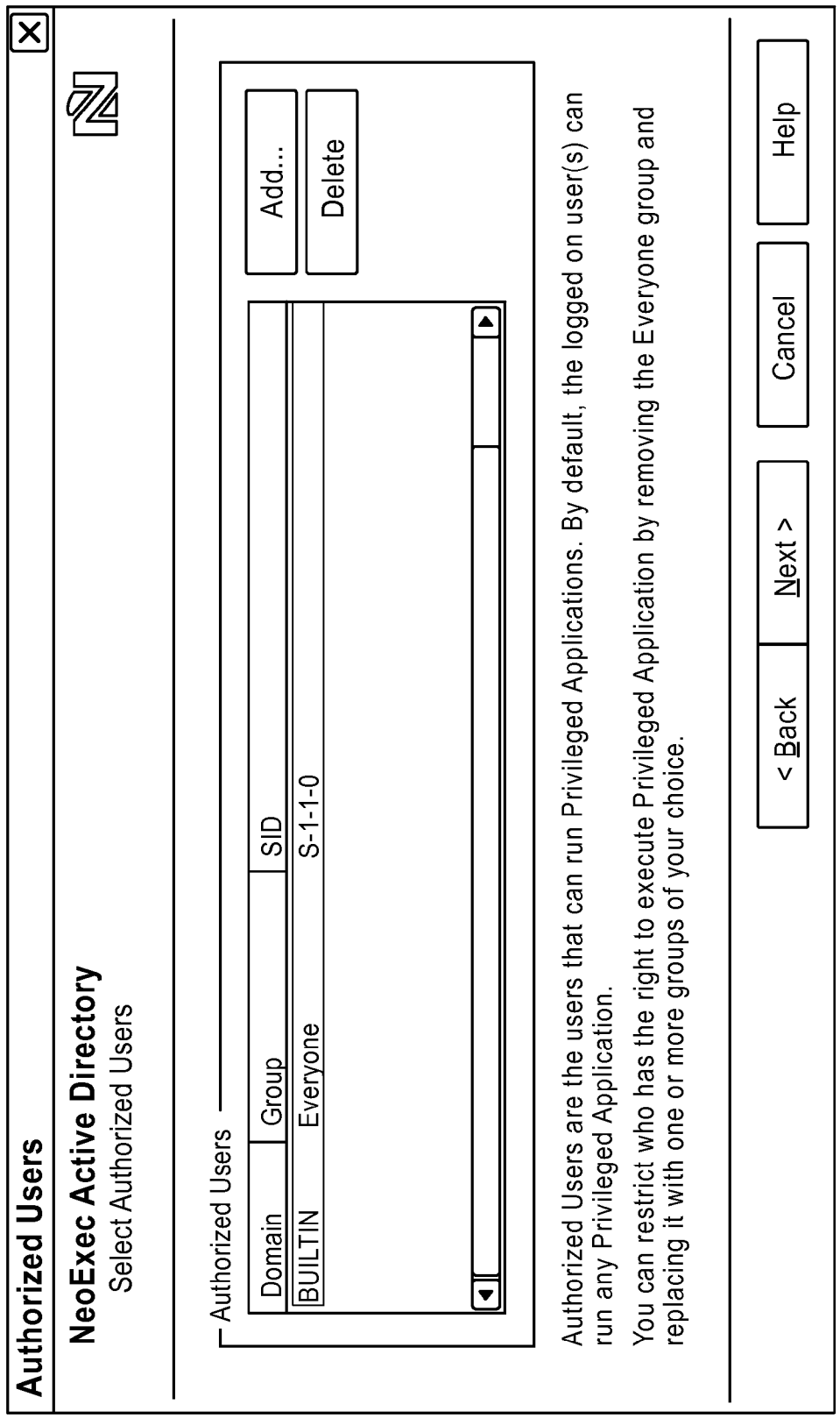
FIG. 9 is a graphical user interface for optionally limiting application of the rule to specified users in some embodiments.

The administrator or other user may optionally identify a particular user or users in the rule, for example by indicating a particular group as shown in the graphical user interface of FIG. 9. FIG. 9 is a graphical user interface for optionally limiting application of the rule to specified users in some embodiments. This option may restrict application of the rule to those identified users. Alternatively, in some embodiments, restricting application of the rule may be done through filters or through the OU level, and not as a part of the individual rule configuration. As is explained further herein, this option may serve as a filter criterion at the policy level, or as a filter criterion each time a process is executed on a digital device. By default, this option may be turned on and identify all users through, for example but not limited to, an Everyone Group.

Additionally, a rule may also include an option to block or allow inheritance by a child process of the token of the corresponding parent process. The parent process may have been modified from the original access token. If the option to block or allow inheritance is set to "allow," a child process may inherit the potentially modified token of its parent process. If the inheritance option is set to "block," and the parent process is itself a child of another process, the child process receives the token of its grandparent. Otherwise, the child process may receive the original, unmodified access token created when the user initially logged on to the digital device.

In some embodiments, rules may be created within a group policy object. It is possible for an administrator or other user to include a user-defined criteria as a filtering scheme that may be added to any policy. The user-defined criteria may be added after the policy corresponding to a rule has been added to the policy object. In some embodiments, a point-and-click filter graphical user interface, as shown in FIG. 10, shows options available for adding administrator-defined filter criteria to a policy or policy object in some embodiments.

Figure 10:
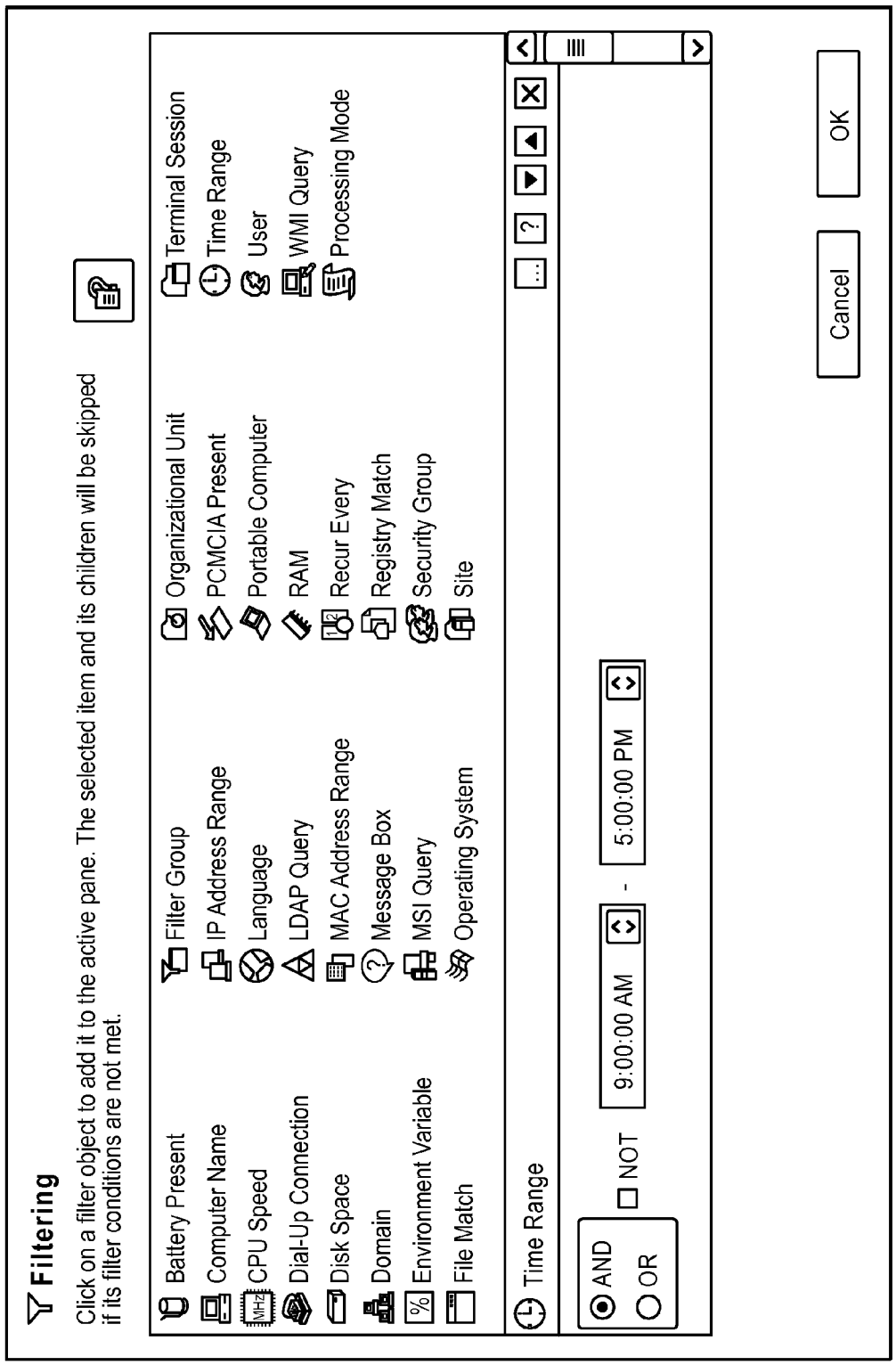
FIG. 10 depicts a filter graphical user interface showing options available for adding administrator-defined filter criteria to a policy or policy object in some embodiments.

The graphical user interface depicted in FIG. 10 may include one or more options, including, but not limited to, options to facilitate a drag and drop of user-defined filter criteria within a single user-defined filter control, a drag and drop of user-defined filter elements between filter controls from other policies, a standardized per filter naming and documentation capability, a generalized automatic generation of environment variable with filter results, standardized tracing, event logging and reporting, standardized Boolean operators (and/or/not) applied to filters, indefinite level of nesting to graphically represent logical parenthetic expressions, integration with Windows environment variables (read/write), an ability to generate environment variables for use in follow-on filters or configurations, and a hidden filter capability that allows configuration items to transparently leverage the filter system without presenting those generated filters to administrators.

In some embodiments, the filter graphical user interface of FIG. 10 may facilitate the selection of filter criteria in a manner that allows a system administrator or other user to perform actions such as drag-and-drop to add/remove filter criteria from the policy. Some filter criteria may include, but are not limited to, Battery Present, Computer Name, CPU Speed, Dial-Up Connection, Disk Space, Domain, Environment Variable, File match, Filter Group, IP Address Range, Language, LDAP Query, MAC Address Range, Message Box, MSI Query, Operating System, Organizational Unit, PCMCIA Present, Portable Computer, Processing Mode, RAM, Recur Every, Registry Match, Security Group, Site, Terminal Session, Time Range, User, and WMI Query. A filter criterion may have various settings depending on the filter criterion type. These filter settings may be modified by the administrator or other user. The user-defined filter criteria may be associated with logic to allow for a determination of whether the policy should be applied to a given digital device on the network.

As described herein, policy objects may be associated with one or more directory containers. These directory containers, which may be domains, sites, or organizational units, may be are arranged hierarchically. In some embodiments, a domain may include within it a plurality of sites, each of which in turn may include a plurality of organizational units. For example, within a company, a domain may encompass each digital device that belongs to the company, a site may encompass all of the digital device located on a particular floor of the company's building, and an organizational unit may encompass the digital devices of a particular group within the company, such as the Engineering Department. A policy object that is associated with each of those containers may have its policies applied to those digital devices when the policy objects are deployed by the policy management system.

The policy management system may include options to order the policy objects within a container and/or across containers. This may allow an administrator to address the order in which policies from different policy objects are applied, and to address how conflicts between policy objects may be resolved. Each directory container may include options, which may be set by the administrator, to enforce the policy objects associated with the container on the digital devices associated with the container, and to block the policy objects associated with containers that are lower in the hierarchy.

Before a policy is applied to a digital device associated with a directory container, any user-defined filter criteria contained in the policy may be run to determine if the digital device satisfies the criteria. Policies may also be applied according to users in a directory container (OU). If the digital device satisfies the filter criteria, the policy management system may be able to apply the policy to the digital device. In some embodiments, application of a policy that corresponds to a rule may cause the digital device to apply the rule to any relevant process(es), as described herein.

Additionally, if a rule includes a user identifier and the system is configured to use the user identifier as a per-policy filter criterion, the SID of the current user logged on to a digital device, or any SID identifying the groups to which that user belongs, may be matched to the user identifier in order for the policy to be applied to that digital device. As discussed herein, the system may be configured to use a user identifier as a filter that is applied whenever a process is executed on the digital device.

In various embodiments, to cause the operating system of a local digital device to apply the rule or rules it receives, a driver may be installed on the local digital device. During installation, the driver may register with the OS, such that, when a process is being executed on the local digital device, the OS may inform the driver of this action.

When a local user subsequently performs an action that causes the OS to execute a process, the routines described in the flowchart of FIGS. 11A-11D may be executed. FIGS. 11A-11D are exemplary flowcharts showing how a local digital device may applies the rule(s) it receives as policies to processes as they execute on the local digital device in some embodiments.

When the OS calls a first application programming interface ("API") (e.g., in Windows, ZwCreateSection system call) to map the file into memory in step 1002, the driver hooks the first API and retrieves attributes of the process to be executed in step 1004. If the file being mapped into memory is an executable, as identified from the first API, the driver may check whether the process is subject to any rule(s) received as policies. To make this determination, the driver may look at a number of attributes, including, but not limited to, the full path of the file (including its name and location), the session information of the user, the file SHA-1 message digest (which is a unique 20 bytes identifier of the file), and/or the owner of the file. These attributes may be compared with the identifier(s) of each process in the rules applied to the local digital device in step 1006.

If the retrieved attributes match the identifier of any process indicated in a rule, that rule may be then applied to the process. After the OS loads the file image in memory, the OS may call a second API to initialize process context in step 1008. The second API may be, for example, ZwCreateProcess in WINDOWS 2000 or ZwCreateProcessEx in WINDOWS XP, 2003, VISTA 2008, or Windows 7. The driver may hook this second API in order to map the process to the driver's section of memory step 1010, where any rules that apply have been stored.

Figure 11A:
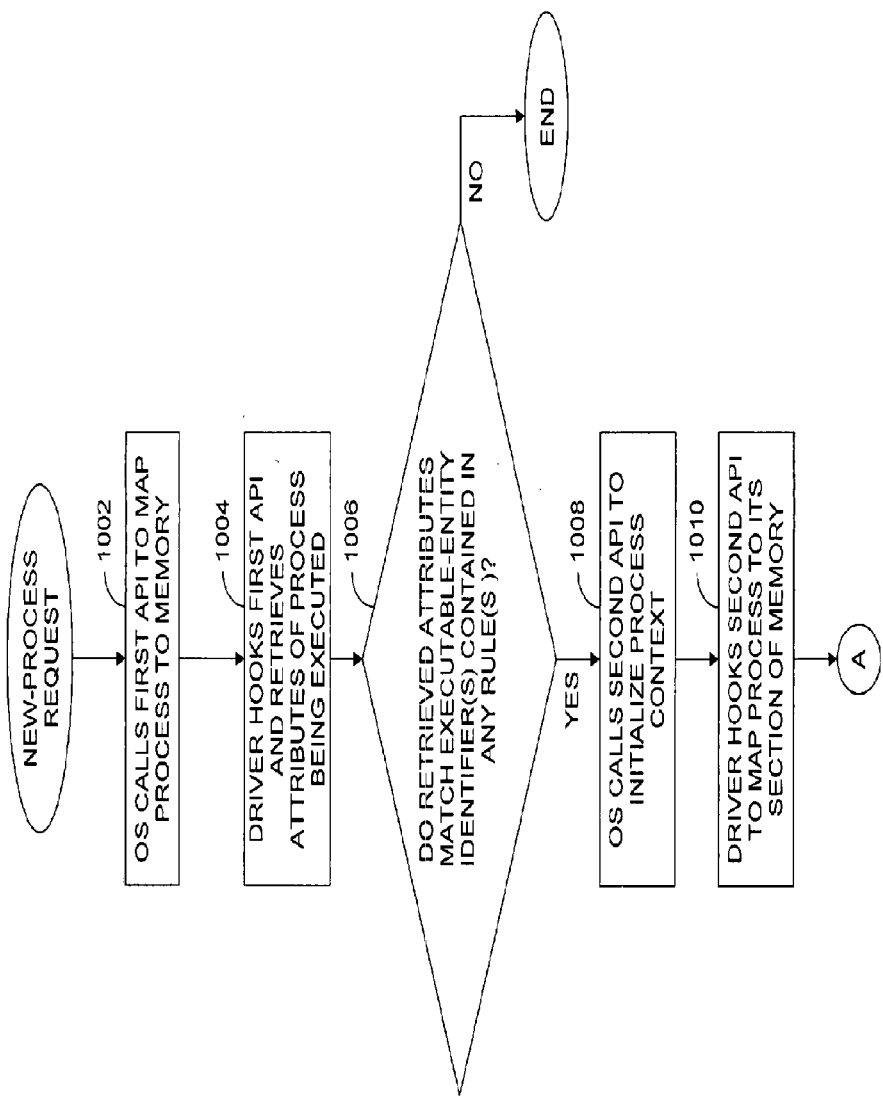
Figure 11B:
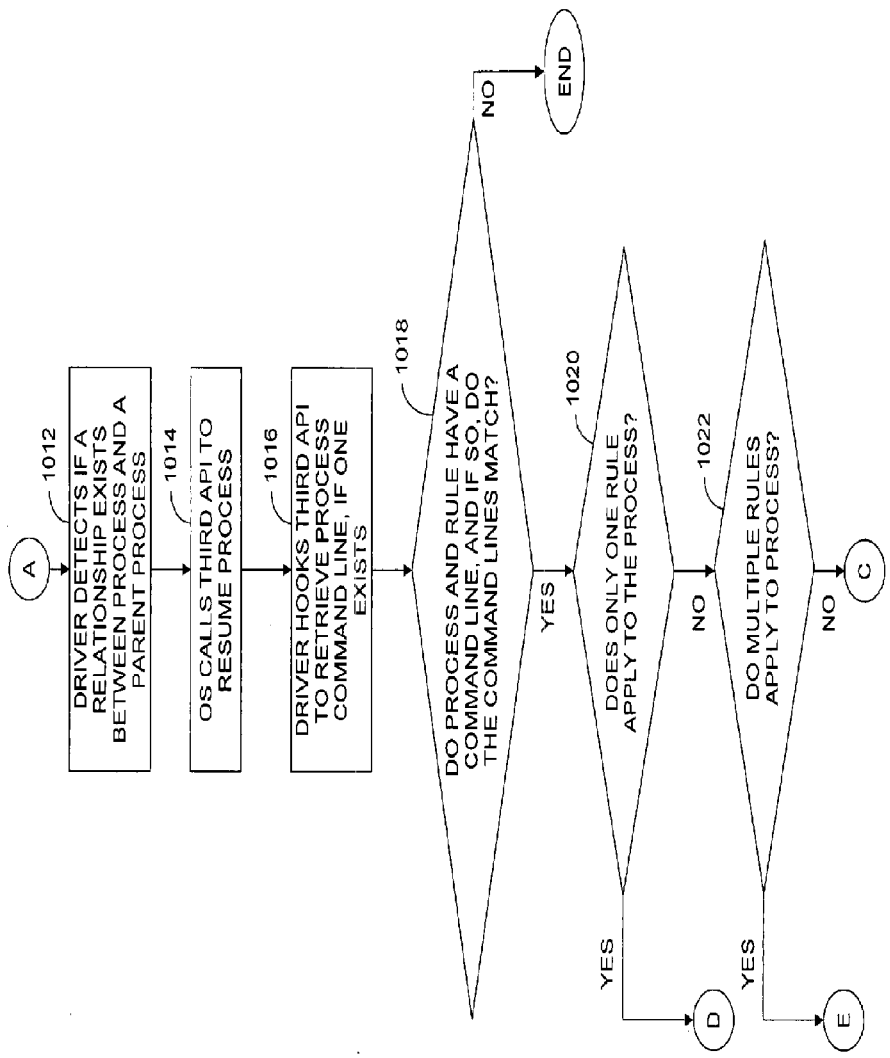

In step 1012 of FIG. 11B, the driver may detect if there is a relationship between the process and a parent process and, if there is a relationship, the driver may store the relationship for later use. Once the process context has been created, the OS may try to start the process by calling a third API to resume the process in step 1014. In one example, the third API may be ZwResumeThread. In step 1016, the driver may hook the third API to retrieve a process command line, if one exists. In step 1018, if the rule contains a command line argument, the argument may be compared against the command line used to start the process. The rule may apply if there is a match. In step 1020, if only one rule applies to the process, the driver may modify the token of the process as described herein. In step 1022, if the process being resumed is subject to more than one rule, the driver may determine which rule(s) to apply.

In some embodiments, the driver applies all applicable rules to the process. Alternatively, a rule may be chosen to be applied according to a priority scheme. One possible priority scheme is that user policies have precedence over machine policies, and for any given rule type, the rule with the highest GPO ID and Order applies. Subsequently, the driver may modify the process token as described below.

Figure 11C:
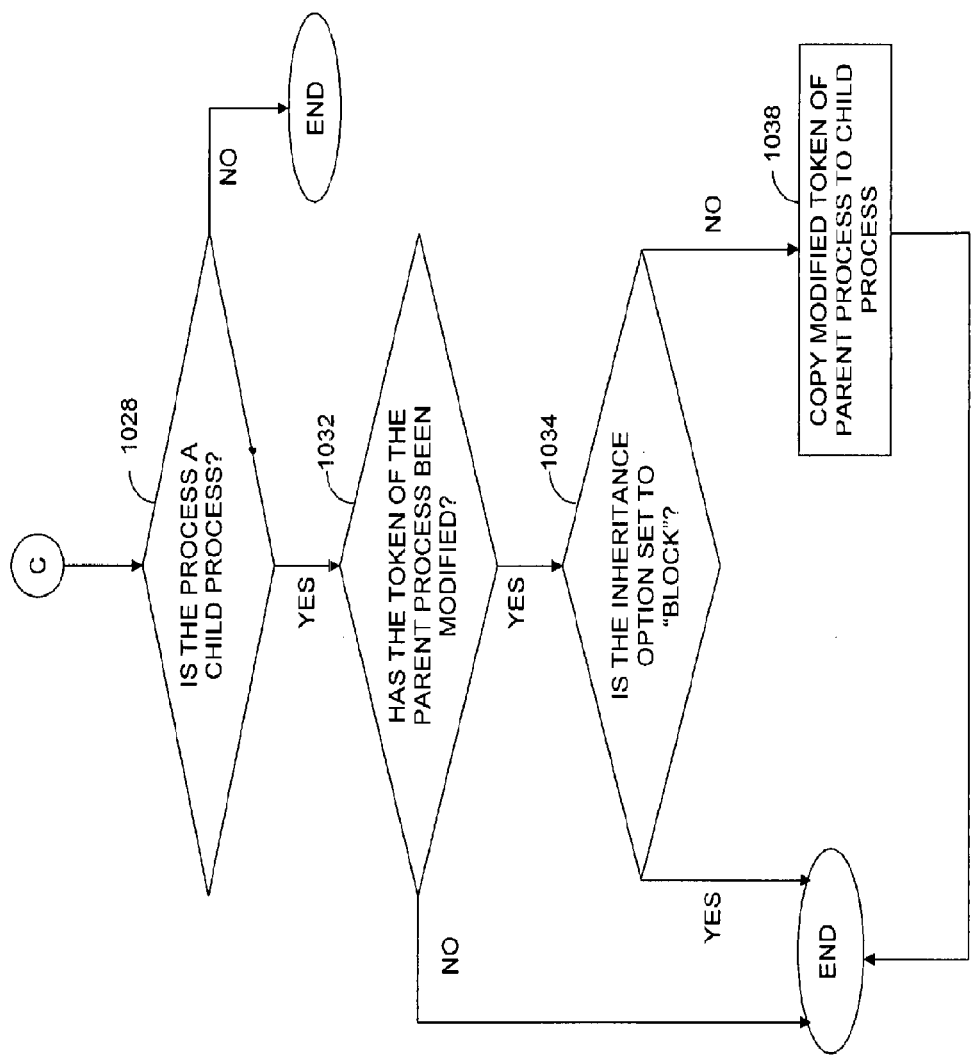

In FIG. 11C, if the process being resumed does not match any rule, the driver may check to see if the process is a child process in step 1028. In step 1032, if the process is a child process, the driver checks to see if the process token of a parent process, if any, has been modified. If the process token of the parent process has been modified, and a determination of the inheritance option indicates that the inheritance option is set to "block" in step 1034, then the driver may reset the token of the child process to equal the original unmodified access token of the logged-on user. If the parent process is itself a child process, the driver may reset the token of the child process to equal the token of its grandparent, which may contain changes. Otherwise, in step 1038, the child process may receive a copy of the process token of the parent process, which may contain changes.

While the embodiment as described above uses systems called hooking, it is also possible to use callback functions provided by the OS to achieve the same results. Examples of such callback functions include, but are not limited to, PsSetCreateProcessNotifyRoutine, PsSetCreateThreadNotifyRoutine, and PsSetLoadImageNotifyRoutine for a Windows-based OS. Those skilled in the art will appreciate that there may be many ways to achieve the same results.

In FIG. 11D, to modify, or replace, a process token, the driver may first obtain the current process token through a call to a fourth API to obtain the previous process token in step 1030. The fourth API may be, for example, ZwOpenProcessToken in a Windows-based OS. In step 1040, the driver may call a fifth API to retrieve token attributes. The fifth API may be but not limited to ZwQueryInformationToken in a Windows-based OS.

Token attributes may include, but are not limited to, TOKEN_GROUPS, TOKEN_STATISTICS, TOKEN_USER, TOKEN_PRIVILEGES, TOKEN_OWNER, TOKEN_PRIMARY_GROUP, TOKEN_DEFAULT_DACL, TOKEN_SOURCE, TOKEN_TYPE, and TOKEN_CONTROL data structures.

The TOKEN_USER structure may identify the user associated with the process token and may be used when the policy to be applied is a user policy. For a user policy, the driver may compare the policy's user SID, as determined at logon, with the content of the TOKEN_USER structure. If there is no match, the driver may stop processing the rule. In some embodiments, this comparison may be required whenever the process has not been started by the currently logged-on user, such as system services.

In step 1050, a rule or rules are applied to the token to change token attributes in accordance with rules. For example, the driver may then apply the rule, which may add one or more SIDs to TOKEN_GROUPS list, remove any one or more of the SIDs present in the TOKEN_GROUPS list, add one or more privileges to the TOKEN_PRIVILEGES list, and/or remove any one or more privileges from the TOKEN_PRIVILEGES list. Each time a token is modified, regardless of the modification(s) made, the driver also may add a group to keep track of the modification(s) made.

After the TOKEN_xxx data structures are set, the modified process token may be created through a driver call to a sixth API in step 1060. The driver may spawn a system thread and calls a sixth API to create the token; the sixth API may be ZwCreateToken, for example. The system thread may execute under the LocalSystem context. After the token has been created, the modified process token through an OS call to a seventh API in step 1070. The seventh API, may include, such is but not limited to, ZwSetInformationProcess.

When the process then executes, the local user may be able to access objects within the process, and/or use privileges, according to the modified process token. When the process terminates, the associated process token may be deleted. The next time a process is created, a new token may be created for that process, according to the method described herein, again starting with the access token that was created when the local user first logged on.

Figure 12:
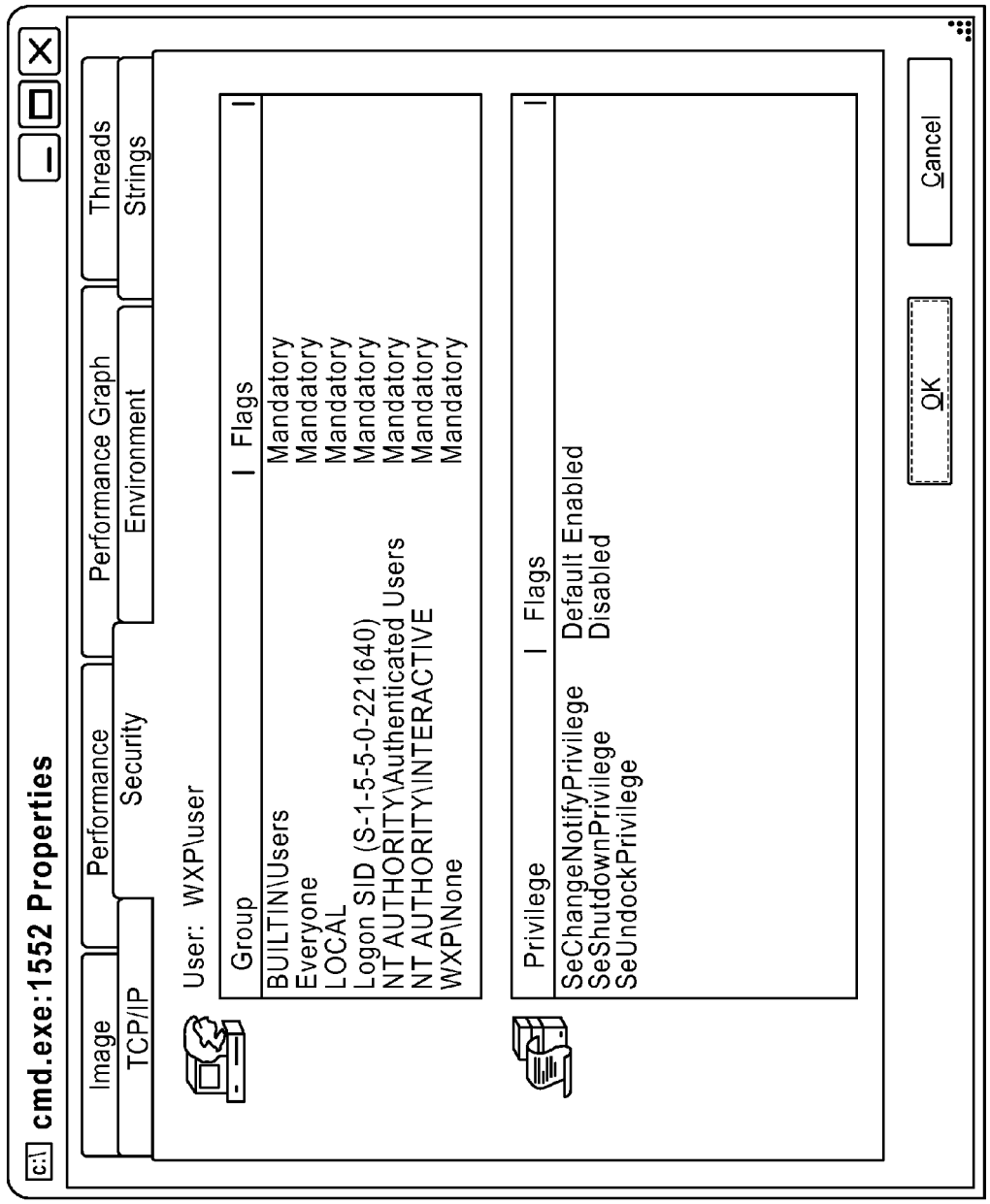
Figure 13:
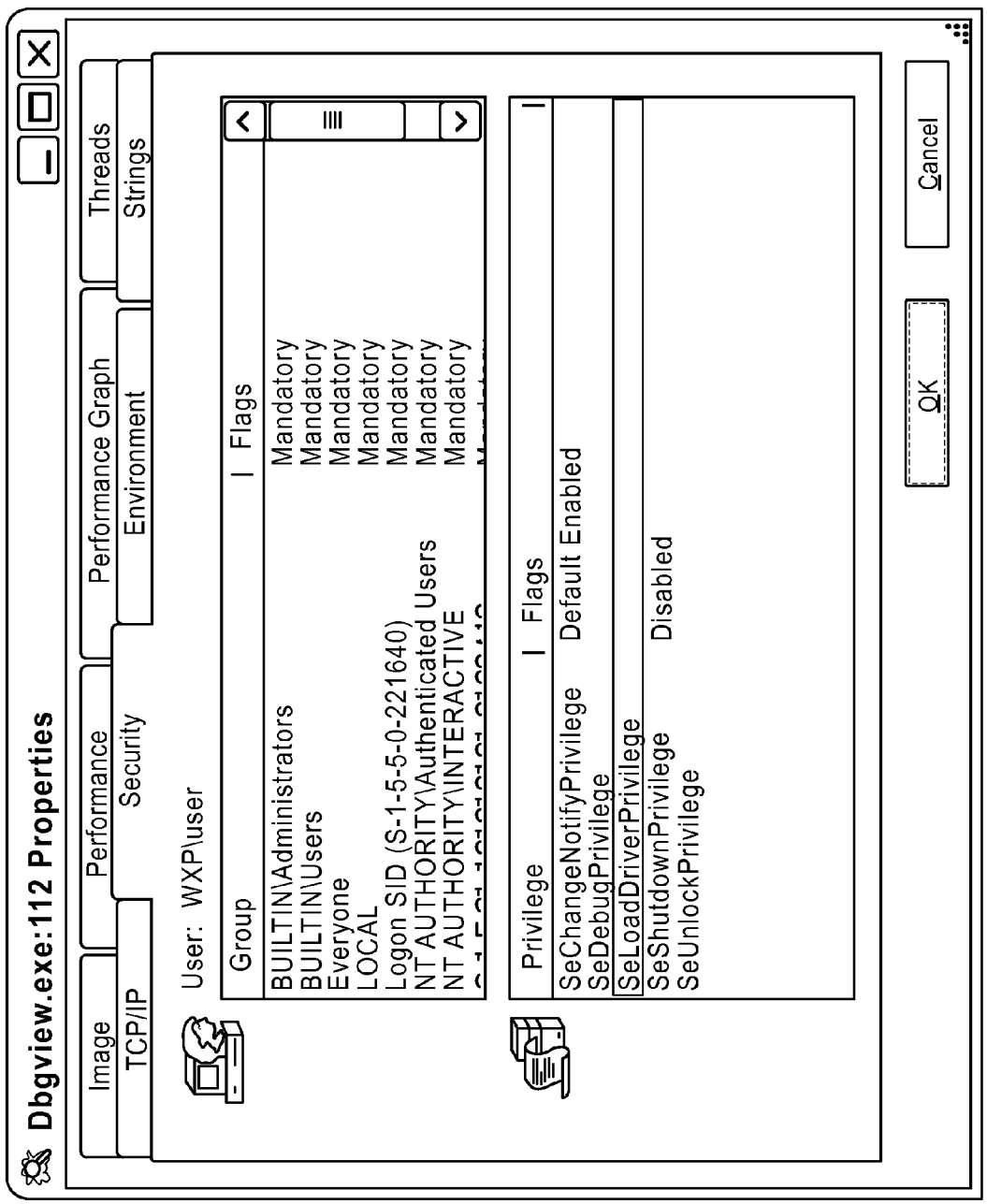
FIG. 13 shows the process token of FIG. 12 modified to include a new group and its corresponding SID in some embodiments.

An example of adding a group and two privileges to a process token is shown in FIGS. 12 and 13. FIG. 12 shows an exemplary unmodified process token containing a user's SID and the SIDs of the group that user is a member of. The process token in FIG. 12 identifies the current user, the groups that user belongs to, and the privileges of that user. In one example, if this user desired to run an application, such as DebugView, the user may not have sufficient group membership and privileges since DebugView requires the user to be a member of the Administrators Group and to have both the Debug Programs (SeDebugPrivilege) and Load and Unload Device Drivers (SeLoadDriverPrivilege) privileges. Thus, in some embodiments, to allow the user to run the application, a rule may be created that indicates that the Administrators Group, and the requisite privileges, should be or are added to the process token for the process DebugView. This rule may then be sent to the local digital device via a group policy object and applied by the driver, both as described herein.

The resultant modified process token is shown in FIG. 13. FIG. 13 shows the process token of FIG. 12 modified to include a new group and its corresponding SID in some embodiments. The modified process token may now contain the Administrators Group, and the Debug Programs (SeDebugPrivilege) and Load and Unload Device Drivers (SeLoadDriverPrivilege) privileges.

In some embodiments, a user may be allowed to run/install MSI/executables that may traditionally require administrative privileges, such as installing software, changing settings on the desktop, and the like. In addition, installing the privilege manager may help to address the problem of malware (e.g., spyware) since the user may not have administrative privileges.

In some embodiments, the privilege manager may enable users to perform administrator functions as needed. In some embodiments, the administrator may configure or generate a policy for each individual user or groups of users (OU's). These configurations may be done remotely through active directory and group directories. The active directory applications may contain all of the information which may help in identifying each user. The user may be provided with a token by which he/she may be authorized to do certain tasks. The token for each individual user may be controlled and modified by the administrator. When a user launches a process, the process may inherit the user's access token. This policy of inheriting the user's access token may be used to increase or reduce the permissions and/or privileges held by the target process token, but may not otherwise affect the user. If a program is launched for which one or more rules apply, the process token may be altered as directed by the rule, including altering the permission, the privilege, and/or the integrity level.

Figure 14:
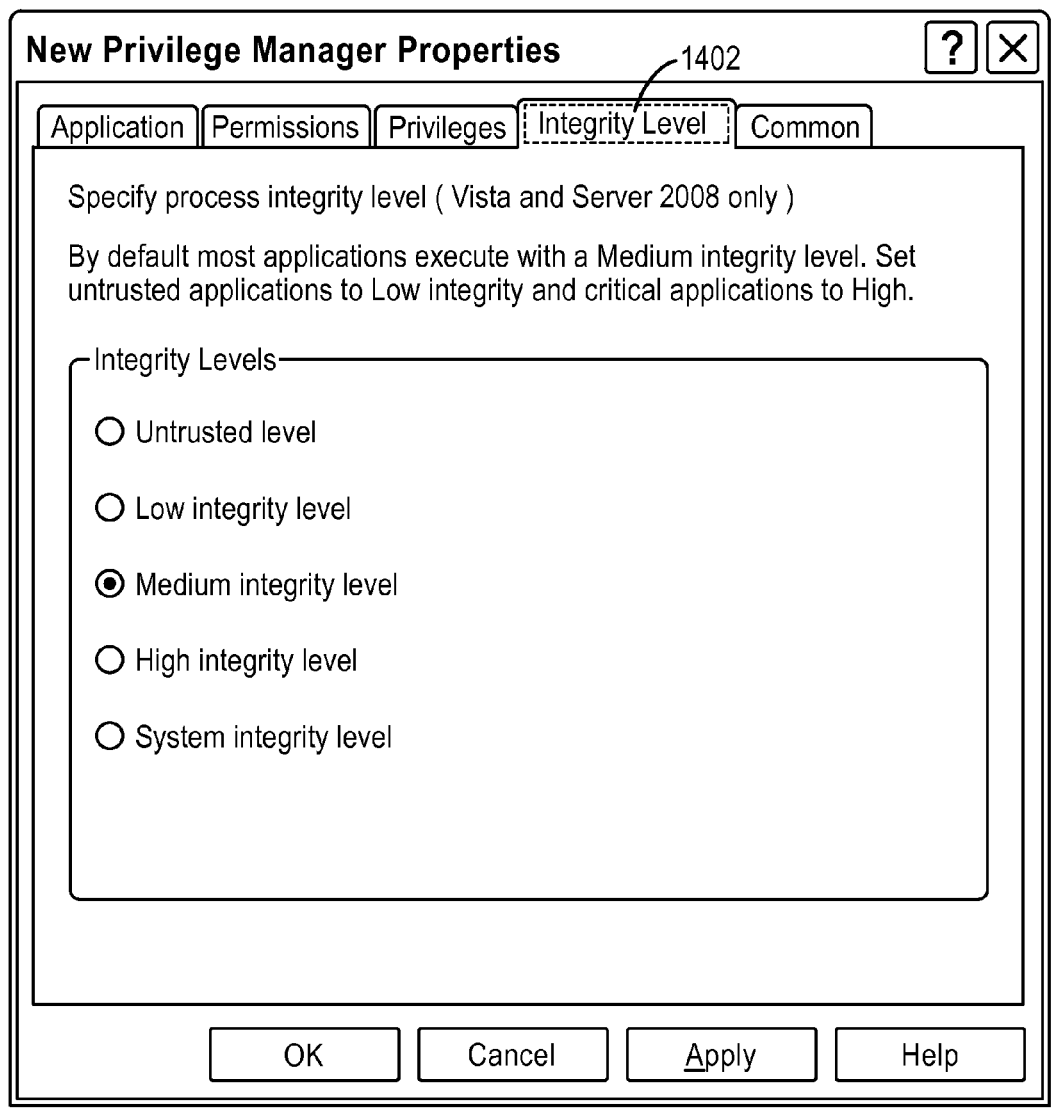
FIG. 14 shows the properties of a privilege manager in accordance with various embodiments of the present invention.

FIG. 14 shows the properties of a privilege manager in accordance with various embodiments of the present invention. As shown in the graphical interface of FIG. 14, the privilege manager may support different integrity levels. In some embodiments, the privilege manager may support changing the integrity level of a process. Examples of the different levels may include, but may not be limited to, un-trusted level, low integrity level, medium integrity level, high integrity level, system integrity level, and the like. By clicking on the "integrity level" tab 1402, the user may specify changes to the integrity level of the targeted application's token. The integrity level of a process may dictate the interaction of one process with another process. In some embodiments, the different processes having different integrity levels may not interact with each other. For example, when a process is elevated to a high integrity level, the process may not be injected with a code from a lower level integrity process and/or may not inject code to other higher level processes with higher integrity level settings. In some embodiments, all resources on a digital device when run by the user may have medium integrity level by default.

In some embodiments, the administrator may specify the integrity level for an indicated process. For example, a standard user may need to install software or a file on the user's desktop in order to carry out a work function. The administrator may elevate the indicated MSI or executable to run under an administrative token. The indicated processes, MSI or executable, and not all the processes, may be elevated. For example, the administrative privileges may not be granted for the entire digital device, but may be granted for just the indicated process, which may protect the digital device and allow the user to install the software or file.

In some embodiments, a shell rule may enable users to elevate applications on demand. The shell rule may allow the user to execute any application. The privilege manager may elevate that application's execution when the user requests elevation, such as by selecting a right-click option to elevate.

Figure 15A:
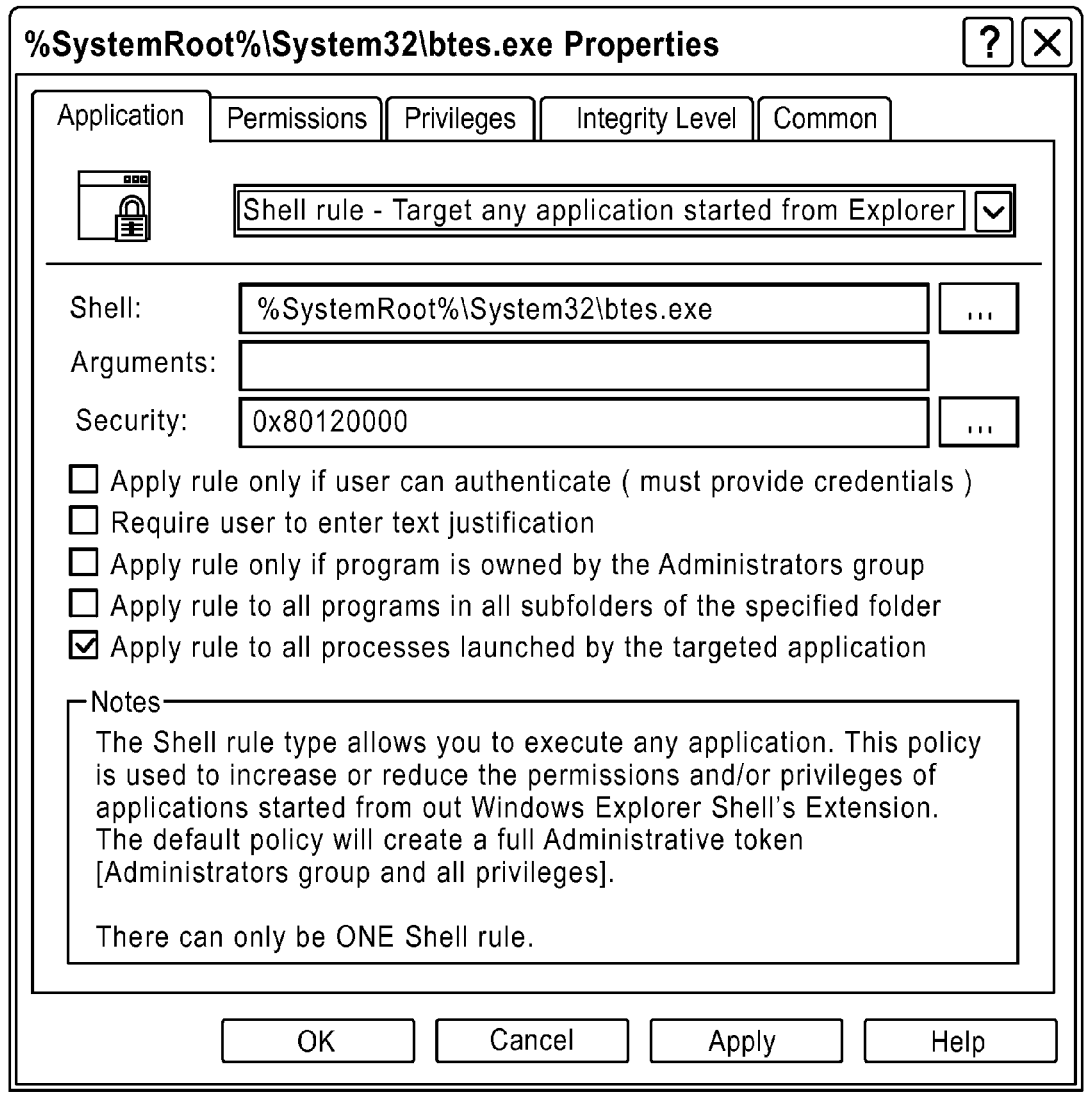
FIG. 15A shows the application of the shell rule in the graphical user interface in accordance with various embodiments.
Figure 15B:
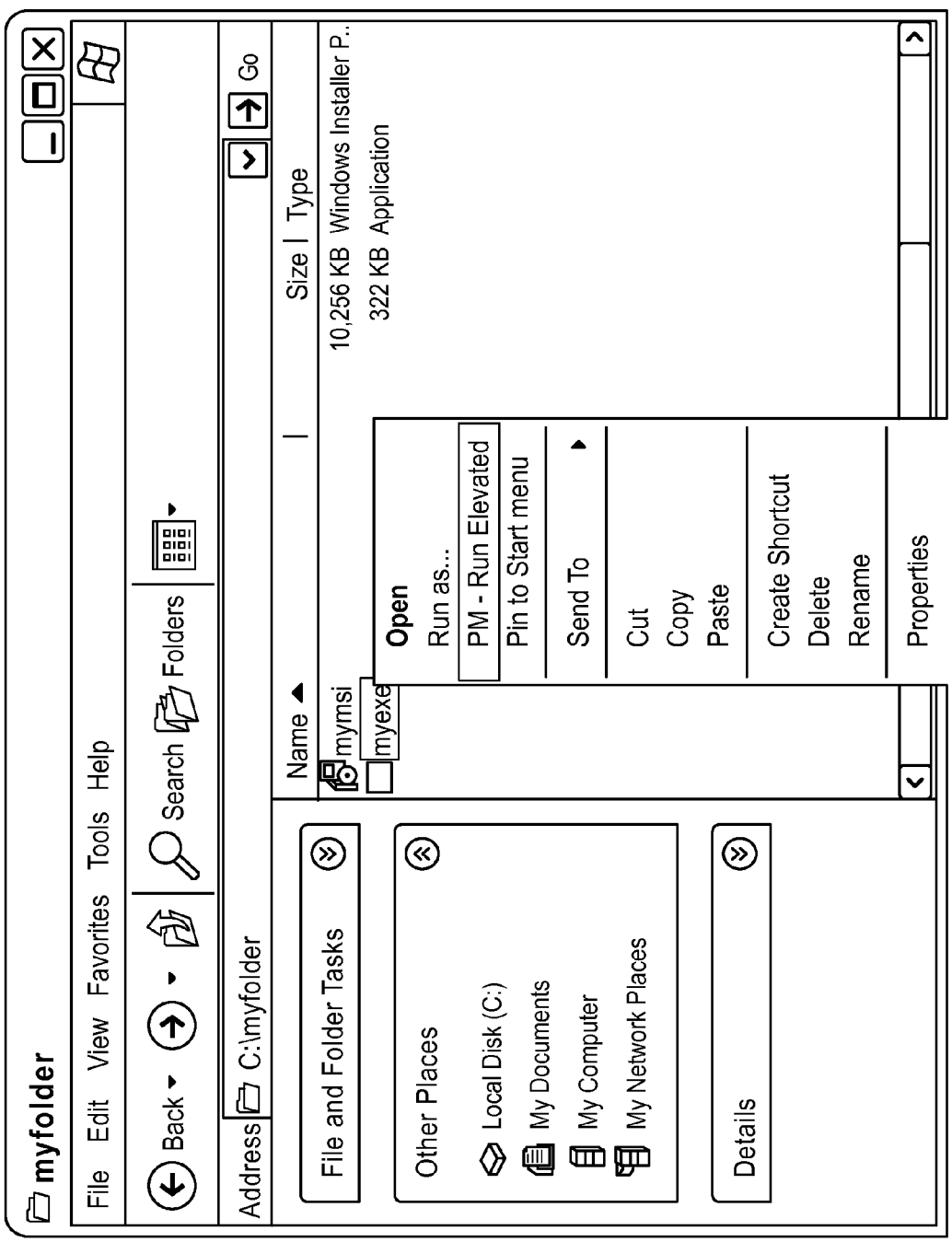
FIG. 15B shows a right click option to elevate applications on demand in the graphical user interface in accordance with various embodiments.

For example, as shown in the graphical interface of FIG. 15A and FIG. 15B, the shell rule may enable the user to elevate any application or MSI by right-clicking on an executable and selecting "PM—Run Elevated" or "PM—Install Elevated." FIG. 15A shows the application of the shell rule in the graphical user interface in accordance with various embodiments. FIG. 15B shows a right click option to elevate applications on demand in the graphical user interface in accordance with various embodiments. The right-click option text, as shown in FIG. 15B, may be customizable via a setting in a predefined template. The user may elevate an application or install a program file by selecting this option. This option may also enable the user to log a record of the elevated execution in the event log.

In some embodiments, to elevate any application, the administrator may require verification of the user's identity by asking for an identifier, such as a password, a biometric scan, and the like. In some embodiments, the administrator may also ask for a reason or justification. By using the logs, the administrator may track what users are doing with their elevated privileges. In addition, by asking for a password or other identifier and/or verification, the administrator may ensure that malware is not elevating the process maliciously. The shell rule may also be used to increase or reduce the permission and/or privileges of different applications. In some embodiments, there may be only one shell rule.

Figure 16:
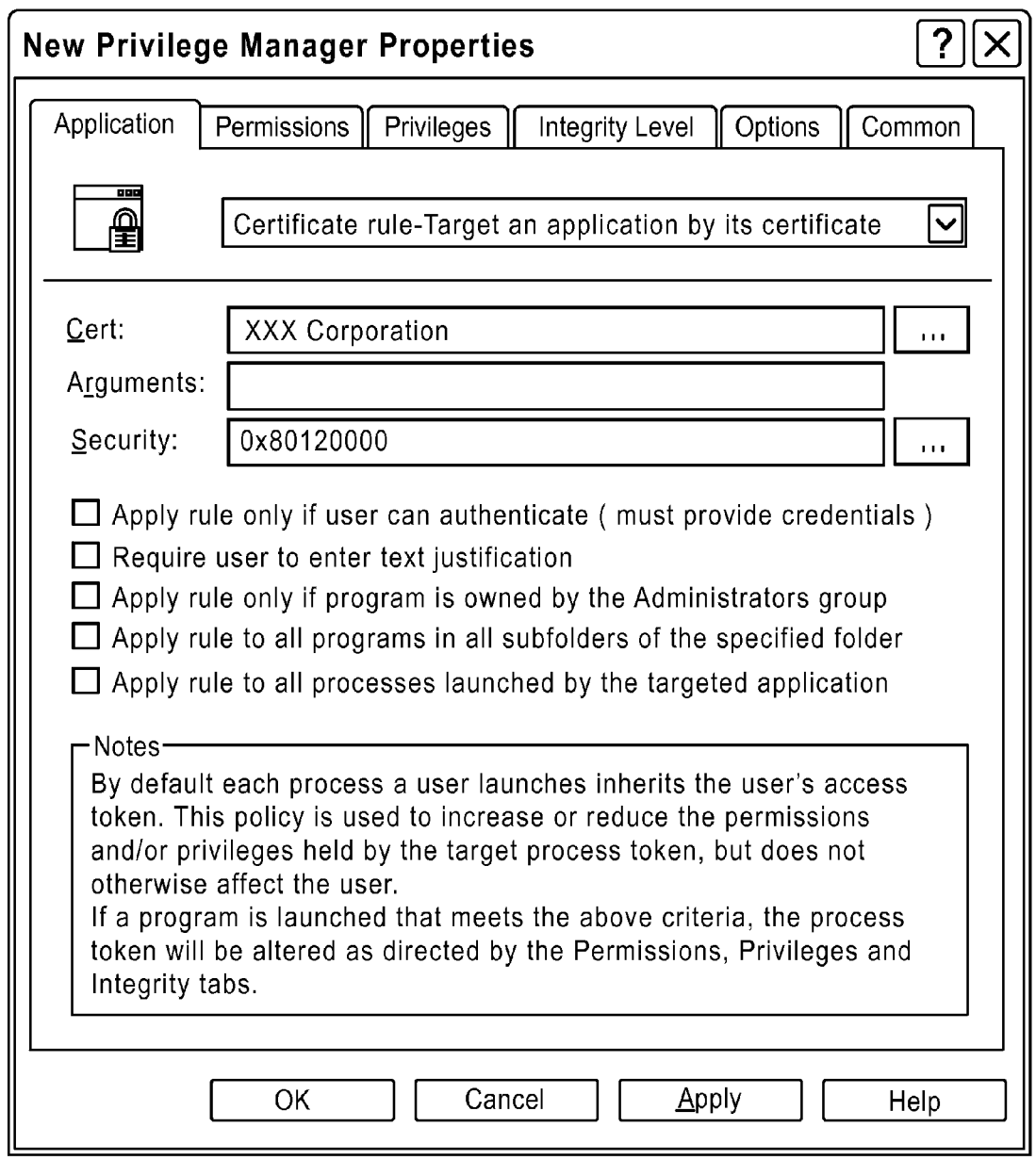
FIG. 16 shows a certificate rule to elevate applications on demand in the graphical user interface in accordance with various embodiments.

FIG. 16 shows a certificate rule to elevate applications on demand in the graphical user interface in accordance with various embodiments. A certificate rule may enable the user to elevate an application based on the company name in the certificate used to sign the executable. For example, as shown in FIG. 16, the certificate rule of the exemplary corporation XXX may enable the user to elevate the application. In some embodiments, any executable file that has been signed with the selected certificate may be targeted by using this rule.

In some embodiments, the certificate rule may be applied in different circumstances. For example, this rule may be applied when the user authenticates his identity by providing credentials such as a user name, password, and the like. In another example, this rule may be applied when programs may be owned by the administrators. This rule may increase or reduce the permissions and/or privileges held by the target process token but may not otherwise affect the user.

Figure 17A:
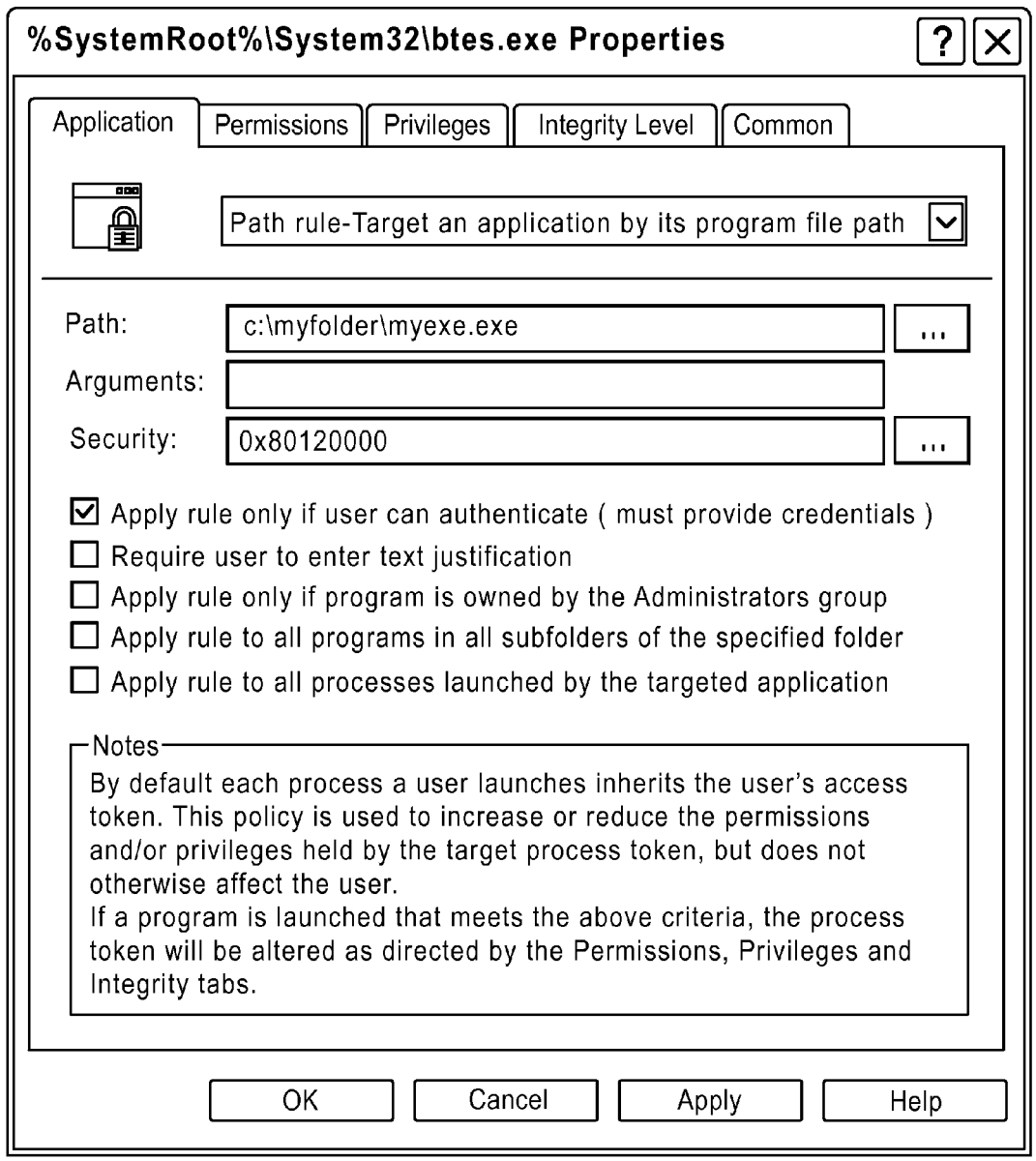
FIG. 17A and FIG. 17B show user authentication to create a rule in the graphical user interface in accordance with various embodiments.
Figure 17B:
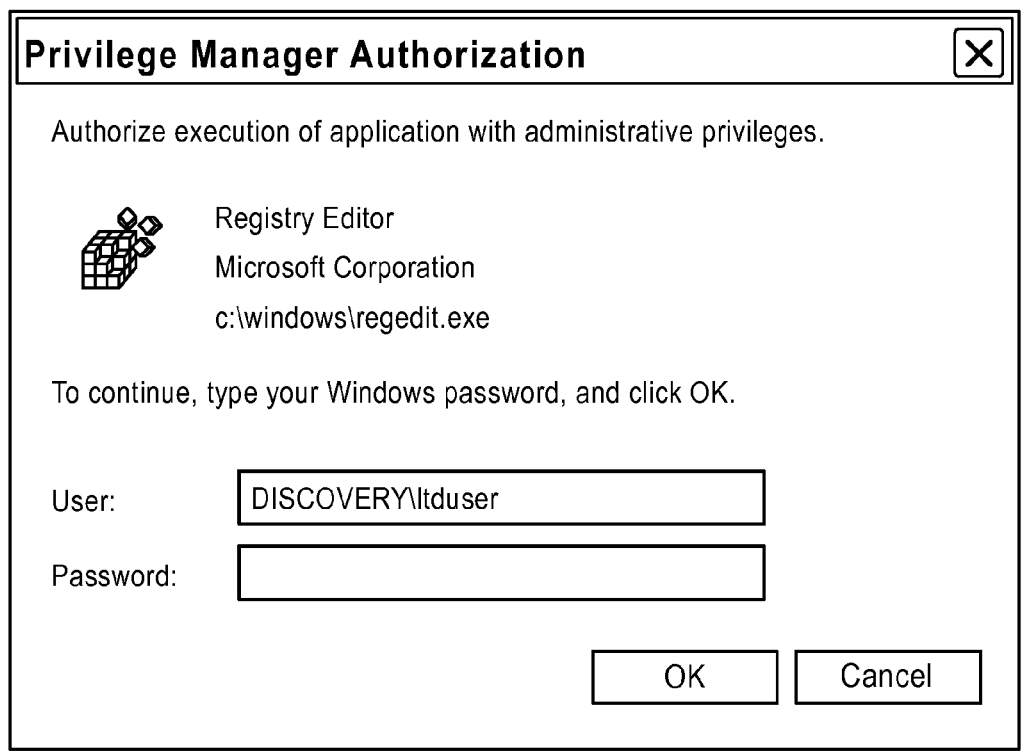

FIG. 17A and FIG. 17B show user authentication to create a rule in the graphical user interface in accordance with various embodiments. A rule may be applied if the user authenticates his credentials as shown in FIG. 17A and FIG. 17B. For example, as illustrated in the exemplary graphical interface of FIG. 17B, the privilege manager client authentication dialog may prompt the user for credentials when the targeted executable file is executed. The credentials may include, but may not be limited to the username, password, and the like. The password may be a numeric password, an alphanumeric password, a bio-metric password, and the like.

Figure 18:
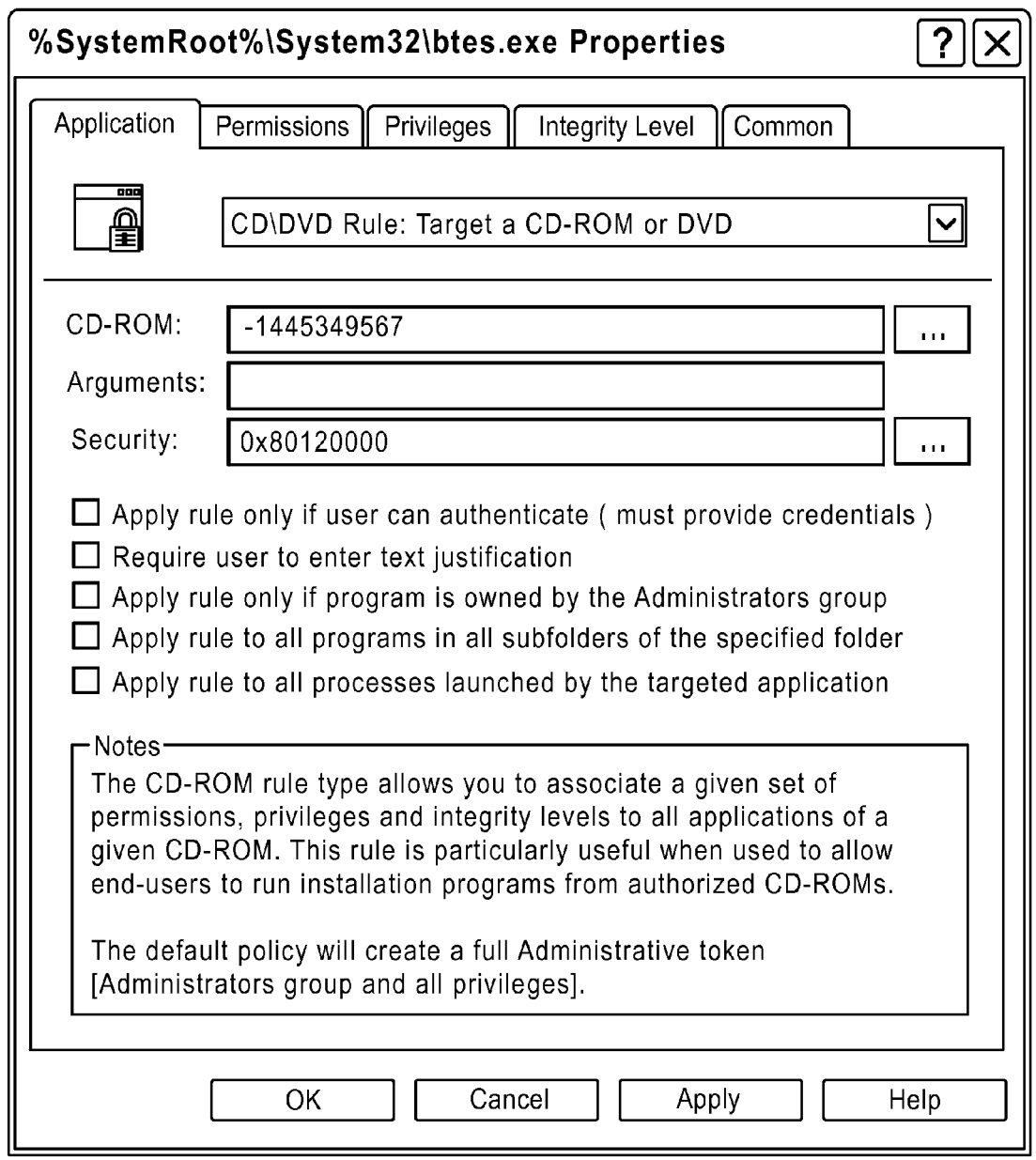
FIG. 18 shows a CD/DVD rule enabling the user to elevate all applications on a certain CD or DVD in the graphical user interface in accordance with various embodiments.

FIG. 18 shows a CD/DVD rule enabling the user to elevate all applications on a certain CD or DVD in the graphical user interface in accordance with various embodiments. In some embodiments, as illustrated in FIG. 18, the privilege manager may provide a CD/DVD rule. This rule may enable the user to elevate all applications on a certain CD or DVD. The browse button may launch the file browser, which may detect the serial number of the selected CD or DVD and may write the value to the field. Those skilled in the art may appreciate that the present embodiment may be applicable to any of the storage devices. Examples of these storage devices (i.e., computer readable mediums) may include, but may not be limited to, blue ray disk, a pen drive, an external hard disk, a floppy drive, and a tape drive.

Figure 19A:
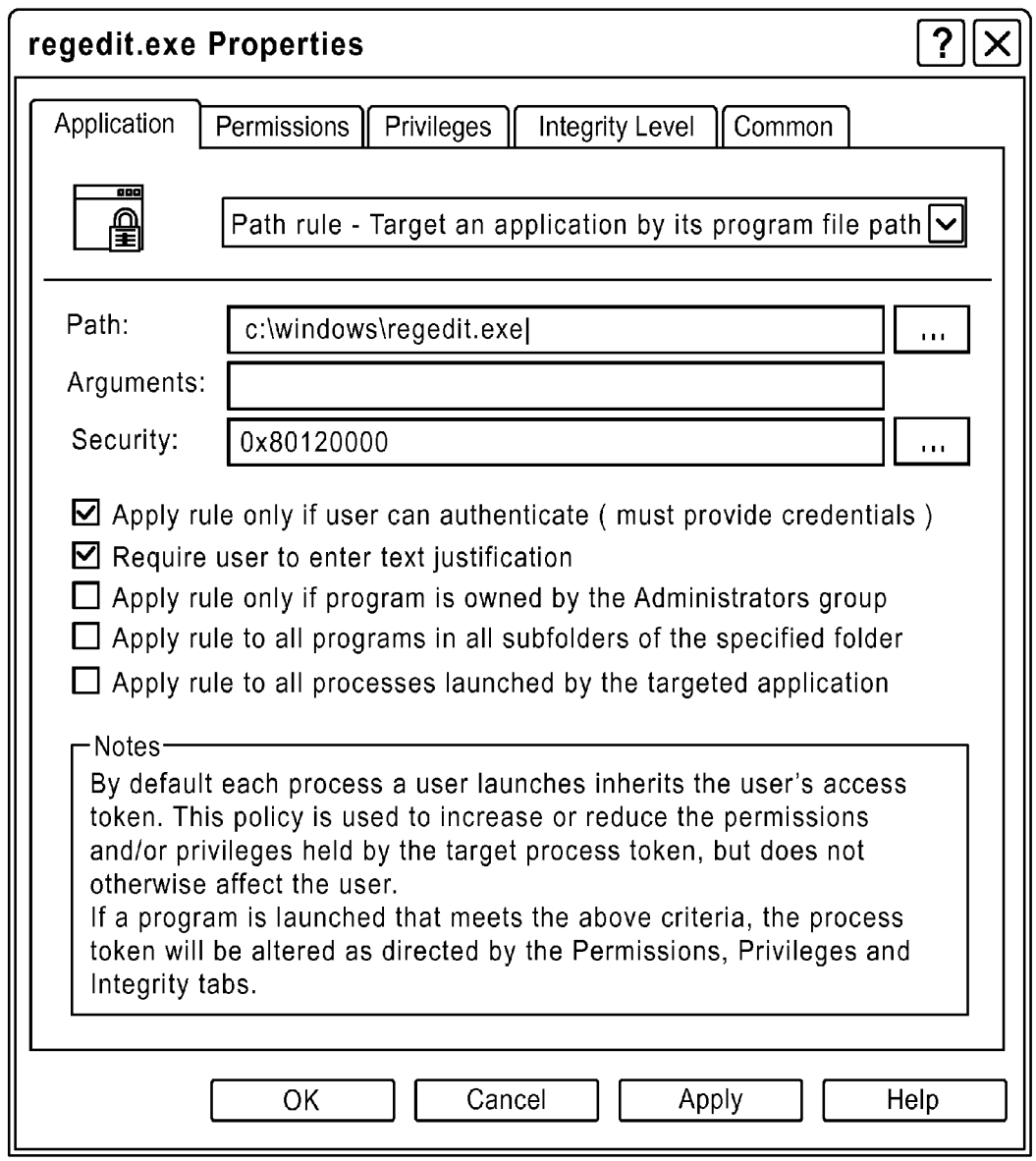
FIG. 19A and FIG. 19B show the graphical user interface to enter a justification for the application elevation in accordance with various embodiments.
Figure 19B:
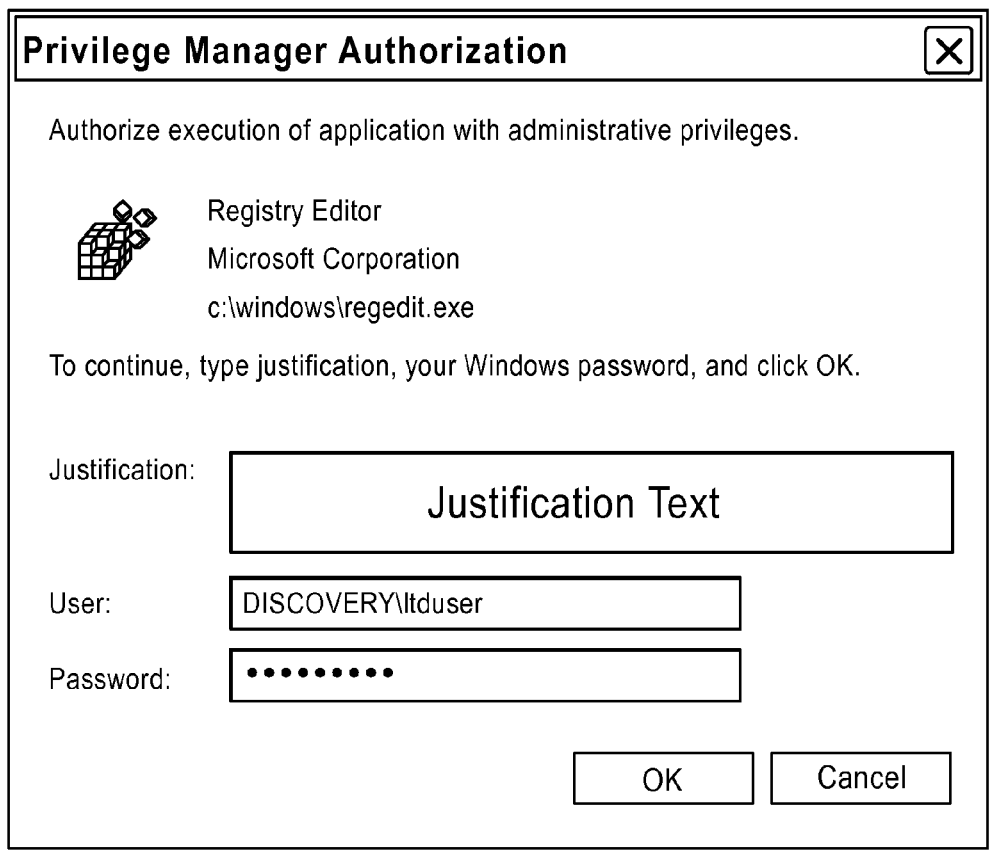
Figure 19C:
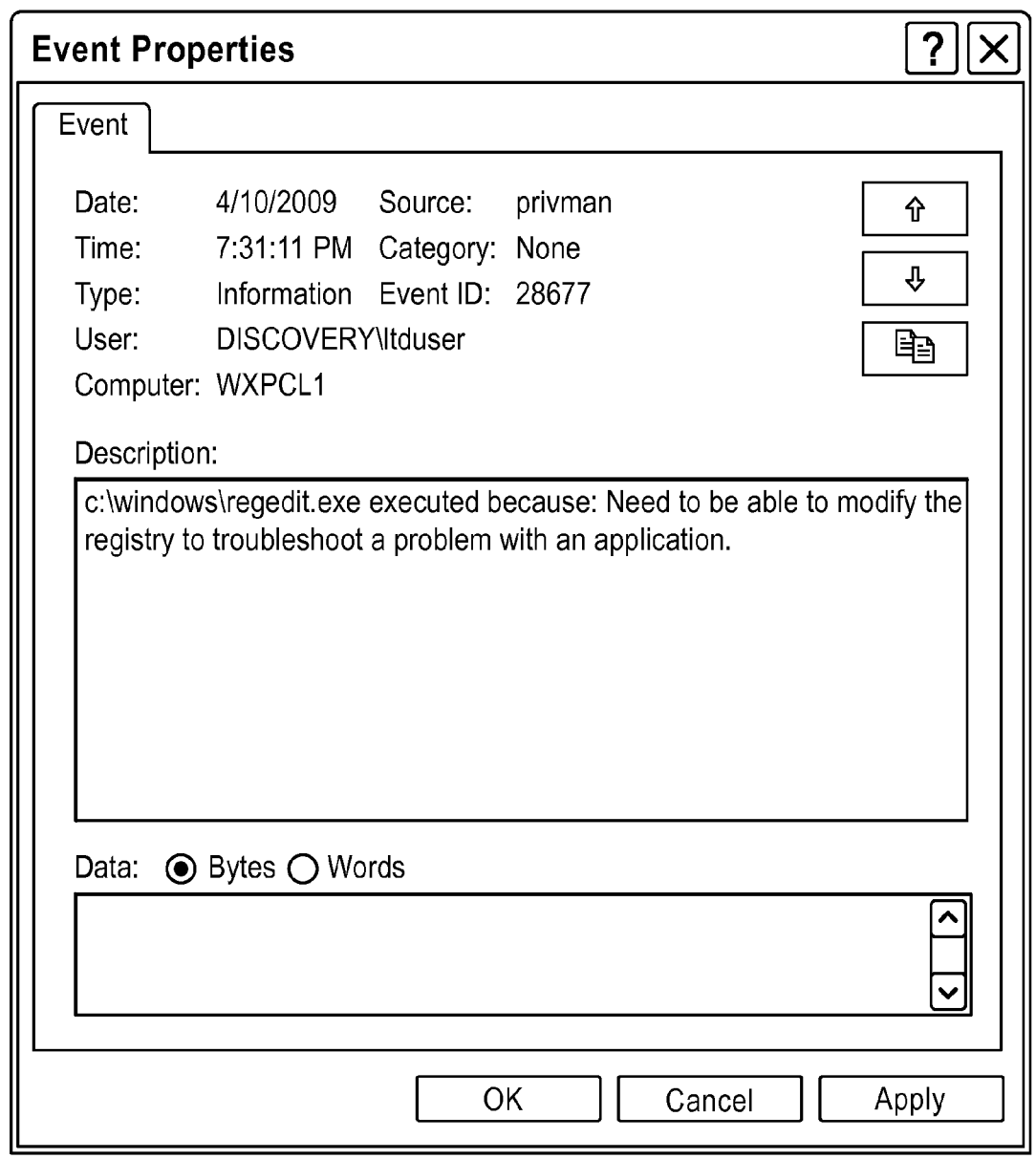
FIG. 19C shows an exemplary event log in a client machine in accordance with various embodiments.

FIG. 19A and FIG. 19B show the graphical user interface to enter a justification for the application elevation in accordance with various embodiments. The user may need to enter a justification for the application elevation, which may be logged to the system event log. The privilege manager client authentication dialog may prompt for credentials and justification when the executable is executed. In an exemplary scenario and as illustrated in FIG. 19B, the user may be required to provide justification. The justification along with the other details may be logged to the client machine's system event log. FIG. 19C shows an exemplary event log in a client machine in accordance with various embodiments.

In order to enable UAC prompt-free security and have users still run as administrators, such as on an OS, such as VISTA with UAC enabled when the user has administrative privileges (i.e., when the user may be a member of Network Configuration Operators Group) the administrator may not require authentication and/or justification.

FIGS. 20A, 20B, 20C, and 20D depict flowcharts explaining the various process steps in the application of different policies on the local digital device in accordance with various embodiments. In step 2002, a new process request may be received (e.g., an initiation of a process is detected). In some embodiments, the new process request may be initiated at the local digital device. The new process request may be running an application, running a dynamic link library (DLL) file, a java executable code, and the like. In some embodiments, the new process request may be initiated remotely. The new process request may spawn child processes that may require additional memory and other system resources. The allocation of memory for the new process request may be managed by the operating system. At step 2004, the process may be mapped to the memory. At step 2008, the filter driver may hook into the process and retrieves attributes of the process being executed. In some embodiments, the process may include multiple parameters, which may include, but may not be limited to, process priority, program size, and the starting address for memory location. In an exemplary scenario, the filter driver may use the starting address as a pointer. The filter driver may retrieve the attributes of the process being executed. At step 2010, a check may be performed. The check may correspond to matching the attributes with executable entity identifications contained in any rule or rules. If the attributes match the executable entity identification, a process context may be initialized at step 2012. If the attributes do not match the executable entity identification, the control may be returned to the OS as shown in step 2058 in FIG. 20D.

In some embodiments, after the initialization of the process context at step 2012, the filter driver may hook to map the process to its section of memory at step 2014. For example, if the check was performed at line 5 of any process and was found to be valid, the filter driver may hook the process from line 6 of the program and may resume from line 6 onwards. At step 2018, the filter driver may check for the relationship between the process and parent process. For example, the filter driver may perform a validation test for confirming parent execution identifications before resuming the process.

Figure 20A:
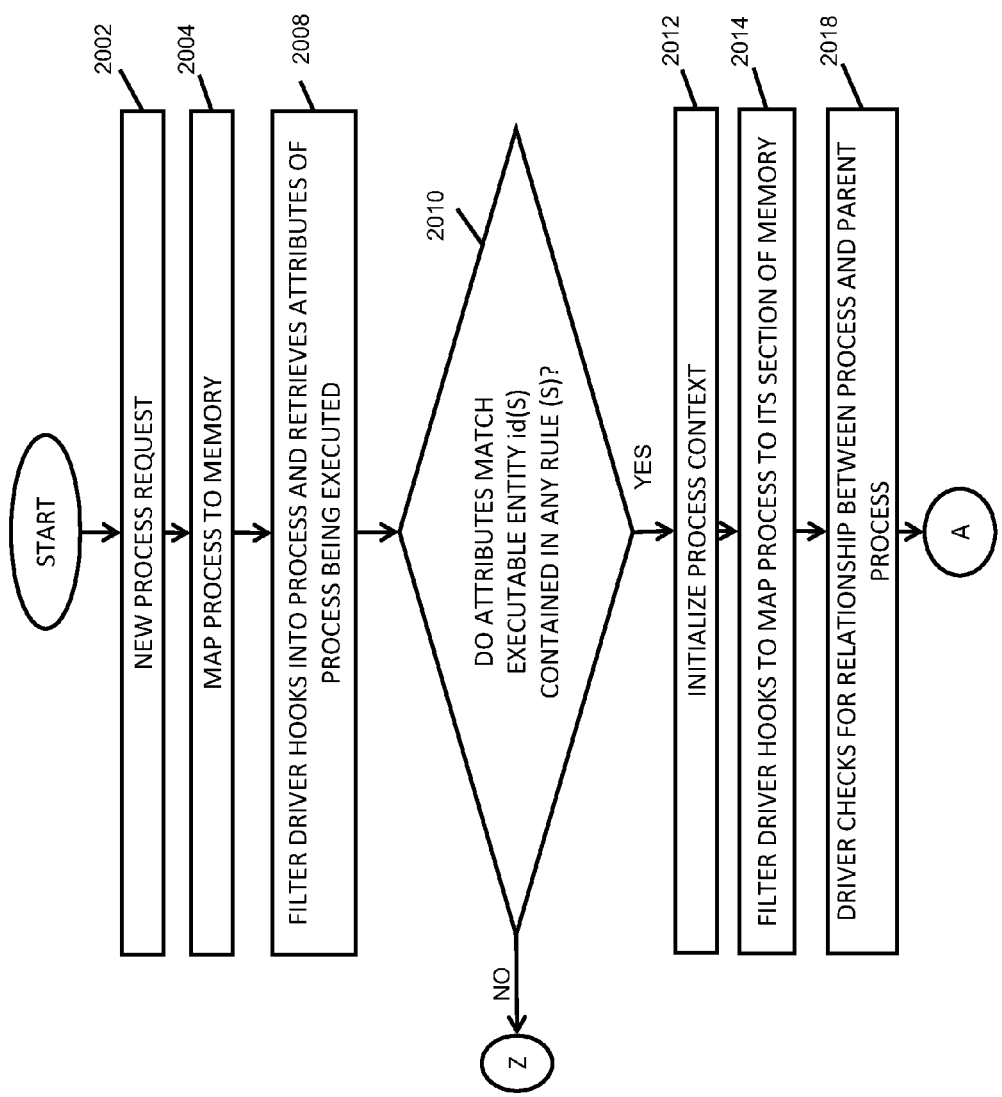
FIGS. 20A, 20B, 20C, and 20D depict flowcharts explaining the various process steps in the application of different policies on the local digital device in accordance with various embodiments.
Figure 20B:
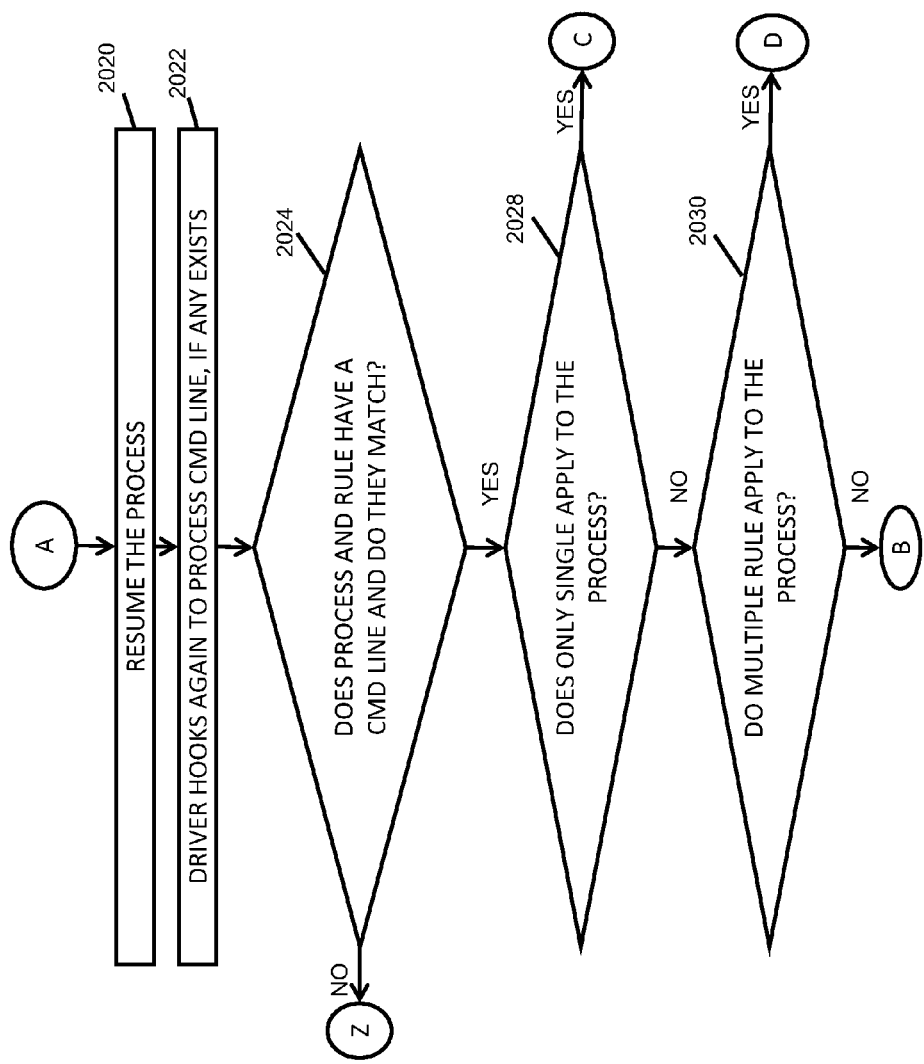

At step 2020 in FIG. 20B, the process may be resumed. At step 2022, the driver may hook again to process CMD line if any CMD line exists. At step 2024, a check may be performed. This check may correspond to the matching of the CMD line of the process and the rule. If the process and the rule have a CMD line and they do not match, the control may be returned from the OS as shown in step 2058 in FIG. 20D.

If the process and the rule have a CMD line and they match, another check may be performed at step 2028. This step may check whether the single rule is applied to the process. In some embodiments, if the single rule may be applied to the process, the filter driver may obtain the previous token attributes as shown in step 2044 in FIG. 20D. In case the single rule does not applied to the process, a check to ascertain the application of multiple rules to the process is performed at step 2030. If multiple rules are applied to the process, the process may flow to step 2042 in FIG. 20D described herein. If multiple rules do not apply to the process, a check to determine whether the process is a child process may be performed at step 2032 in FIG. 20C. If the process is not a child process, then the control may be returned to the OS as shown in the step 2058 in FIG. 20D.

Figure 20C:
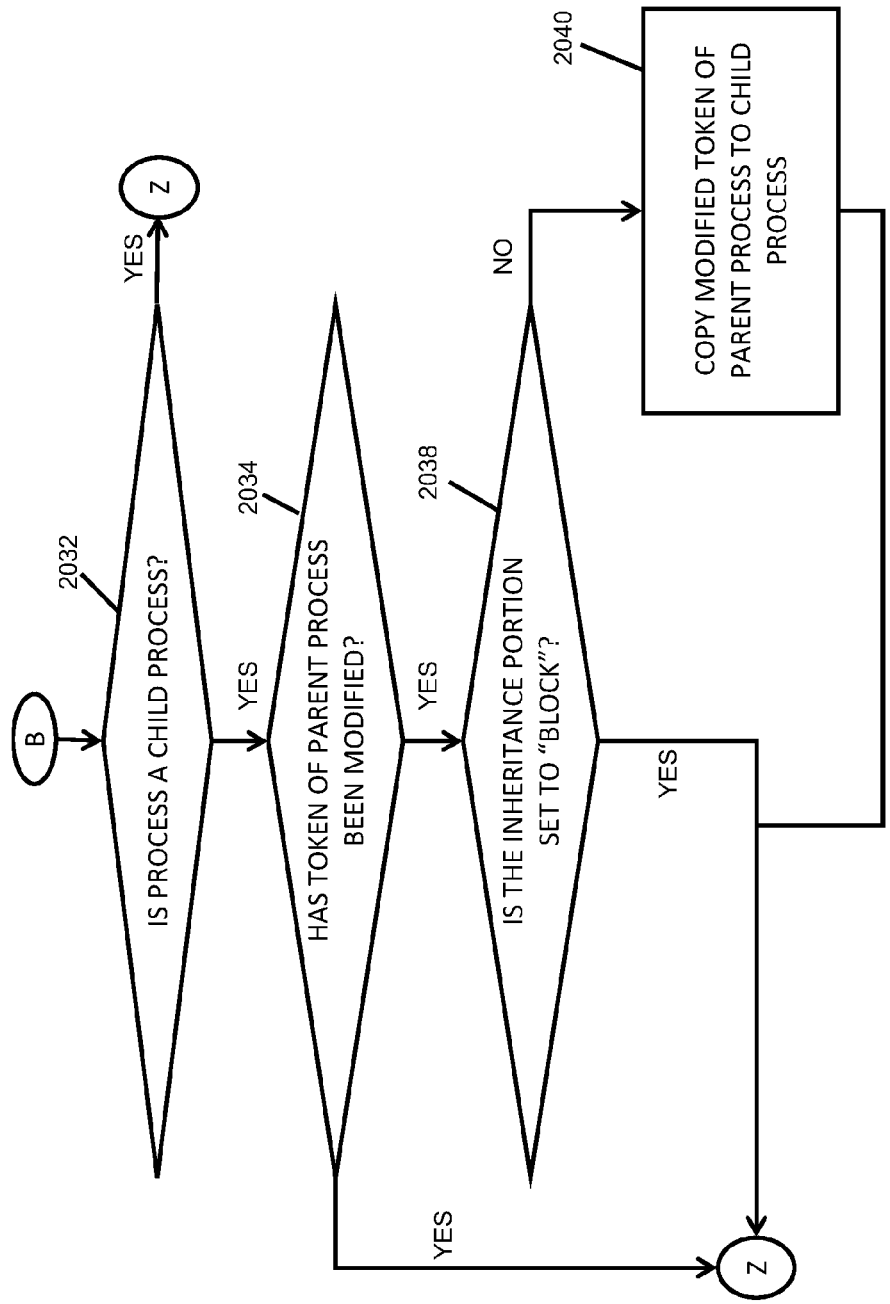

In some embodiments, if the process is child process, a check to determine whether the token of the parent process has been modified is performed at step 2034 in FIG. 20C. If the token of the parent process is not modified, the control may be returned to the OS at step 2058 of FIG. 20D. In another scenario, if the token of the present process is modified, then a check to ascertain whether the inheritance portion is set to "block" may be performed at step 2038. If the inheritance portion is not set to "block," then the modified token of the parent process to child token may be copied at step 2040. Once the modified token is copied, the control may be returned to the OS as shown in the step 2058 of FIG. 20D. If the inheritance portion is set to "block," the control may be returned to the OS as shown in the step 2058 of FIG. 20D.

Figure 20D:
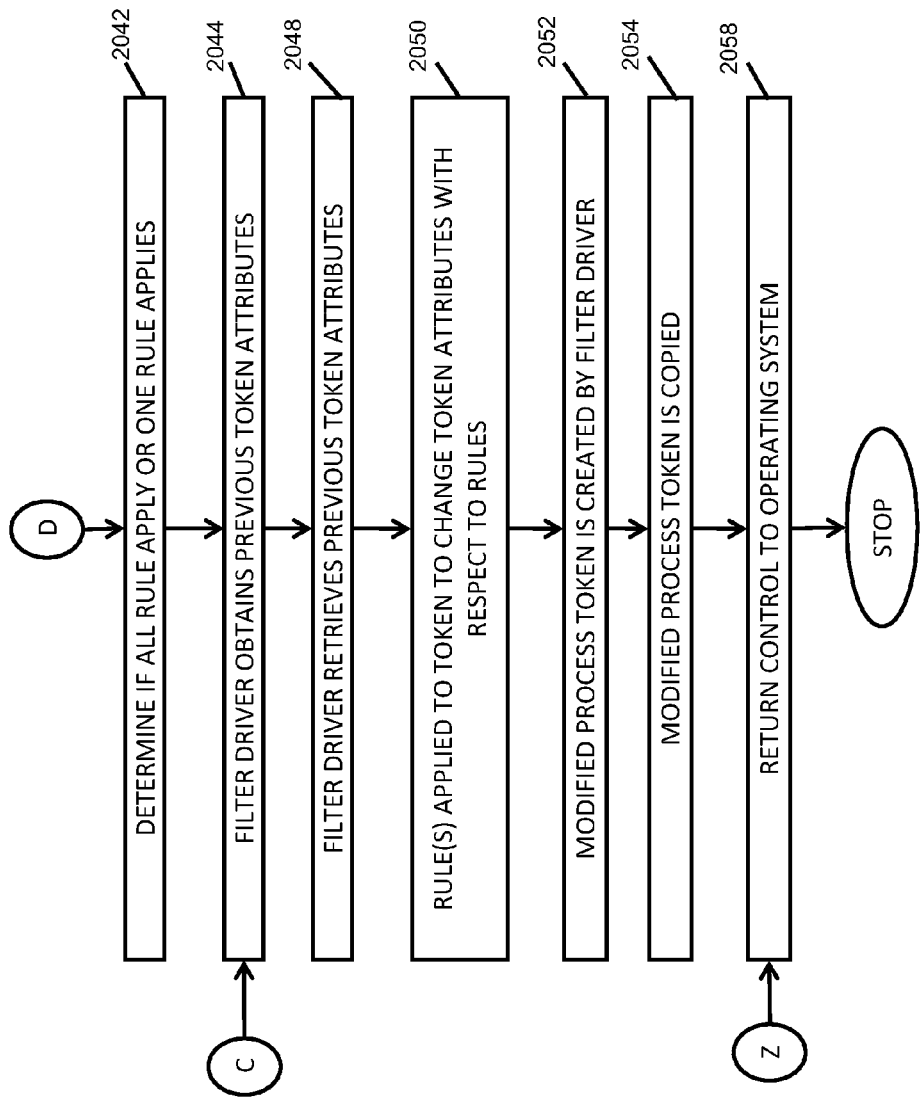

At step 2030 in FIG. 20B and step 2042 in FIG. 20D, a check may be performed to determine whether single or multiple rules are applicable to the process. Following step 2042, the filter driver may obtain the previous token attributes at step 2044 in FIG. 20D. At step 2048, the filter driver may retrieve token attributes. At step 2050, a rule or rules may be applied to the token to change its attributes. At step 2052, the modified process token may be created by the filter driver. At step 2054, the modified process token may be copied and the control may be returned to the OS as shown in step 2058.

This application hereby incorporates by reference U.S. Nonprovisional application Ser. No. 11/206,376, entitled "Methods and Systems for Network-Based Management of Application Security," filed Aug. 18, 2005.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium (i.e., computer readable medium) readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation. Those skilled in the art will appreciate that the RAM, RAID, floppy disks, optical medium (e.g., CD and DVD disks), magnetic disks, internal hard drive, external hard drive, memory stick or other storage device may also be computer readable mediums.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), an intranet, the Internet, and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) (e.g., computers) that integrate with the processor(s) may include, for example, a personal computer(s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation. Similarly, as used herein a system may be a single digital device (e.g., a computer) or comprise multiple digital devices.

References to "a microprocessor," "a processor," "the microprocessor," and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology or the like may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Accordingly, it will be understood that the disclosed methods and systems are not to be limited to the embodiments disclosed herein, may include practices otherwise than specifically described, and are to be interpreted as broadly as allowed under the law.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, in some embodiments, other devices may be required for execution of methods as described in this application may be considered as a part of the infrastructure associated with the server.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, in some embodiments, other devices may be required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the embodiments discussed herein. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While various embodiments have been disclosed and described in detail, various modifications and improvements thereon will become readily apparent to those skilled in the art. Accordingly, the spirit and scope of the present description is not to be limited by the foregoing examples, but is to be understood in the broadest sense allowable by law.

All documents referenced herein are hereby incorporated by reference.

What is claimed is:

1. A method comprising:
    detecting execution of a command to execute a child process;
    determining, before execution of the child process, if one or more rules apply to the child process based on one or more criteria, the one or more criteria facilitating blocking or allowing inheritance by the child process of a parent process token of a parent process;
    modifying, in accordance with the one or more applicable rules, a child process token of the child process to change a security parameter with which to execute the child process, the security parameter comprising a permission, a privilege, and an integrity level with which to execute the child process;
    wherein the modification of the child process token for the security parameter is performed by a user via a privilege manager;
    wherein the user sets the integrity level;
    verifying an identity of the user setting the integrity level;
    requesting a justification from the user setting the integrity level;
    accessing the modified child process token of the child process to determine the security parameter; and
    executing the child process, the child process being executed using the modified child process token; and
    allowing access to an object based, at least in part, on the execution of the child process.

2. The method of claim 1, wherein determining, before the execution of the child process, if the one or more rules apply to the child process based on the one or more criteria comprises determining if at least one of a hash rule, a path rule, a folder rule, an MSI Path rule, an MSI folder rule, an ActiveX rule, a certificate rule, a shell rule, and a CD/DVD rule is satisfied based on all or part of the detected command.

3. The method of claim 1, wherein allowing access to the object based, at least in part, on the execution of the child process, comprises authenticating a user and allowing the user access to the object based on the authentication and the modified child process token.

4. The method of claim 1, wherein the one or more applicable rules require that the child process token is modified if one or more of the child process and the parent process is associated with an Administrators Group.

5. The method of claim 1, wherein if the one or more rules apply to the child process based on the one or more criteria, the method further comprises applying at least one of the one or more applicable rules to multiple programs in a specified folder.

6. The method of claim 1,
wherein the one or more criteria comprises the user matching a user identifier; and
wherein the user identifier is selected from the group of user identifiers consisting of: a password and a biometric scan.

7. The method of claim 6, wherein determining, before execution of the child process, if one or more rules apply to the child process based on the one or more criteria comprises determining if a user associated with execution of the command to execute the child process is identified by the one or more criteria.

8. The method of claim 7, wherein the child process token, before modification, indicates that the user does not have permission to execute the application.

9. The method of claim 8, wherein the child process token, after modification, indicates that the user has permission to execute the application.

10. The method of claim 1, wherein determining, before execution of the child process, if one or more rules apply to the child process based on the one or more criteria comprises determining if a particular command line argument is a part of the command and modifying the child process token based on the determination.

11. The method of claim 1, wherein the setting of the integrity level for the security parameter does not modify the integrity level of one or more other processes.

12. The method of claim 1, wherein determining, before the execution of the child process, if the one or more rules apply to the child process based on the one or more criteria comprises hooking the child process using a driver.

13. A non-transitory computer readable medium comprising executable instructions, the instructions being executable by a processor to perform a method, the method comprising:
detecting execution of a command to execute a child process;
determining, before execution of the child process, if one or more rules apply to the child process based on one or more criteria, the one or more criteria facilitating blocking or allowing inheritance by the child process of a parent process token of a parent process;
modifying, in accordance with the one or more applicable rules, a child process token of the child process to change a security parameter with which to execute the child process, the security parameter comprising a permission, a privilege, and an integrity level with which to execute the child process;
wherein the modification of the child process token for the security parameter is performed by a user via a privilege manager;
wherein the user sets the integrity level;
verifying an identity of the user setting the integrity level;
requesting a justification from the user setting the integrity level;
accessing the modified child process token of the child process to determine the security parameter with which to execute the child process;
executing the child process, the child process being executed using the modified child process token; and
allowing access to an object based, at least in part, on the execution of the child process.

14. The non-transitory computer readable medium of claim 13, wherein determining, before the execution of the child process, if the one or more rules apply to the child process based on the one or more criteria comprises determining if at least one of a hash rule, a path rule, a folder rule, an MSI Path rule, an MSI folder rule, an ActiveX rule, a certificate rule, a shell rule, and a CD/DVD rule is satisfied based on all or part of the detected command.

15. The non-transitory computer readable medium of claim 13, wherein allowing access to the object based, at least in part, on the execution of the child process, comprises authenticating a user and allowing the user access to the object based on the authentication and the modified child process token.

16. The non-transitory computer readable medium of claim 13, wherein the one or more applicable rules require that the child process token is modified if one or more of the child process and the parent process is associated with an Administrators Group.

17. The non-transitory computer readable medium of claim 13, wherein if the one or more rules apply to the child process based on the one or more criteria, the method further comprises applying at least one of the one or more applicable rules to multiple programs in a specified folder.

18. The non-transitory computer readable medium of claim 13, wherein the one or more criteria comprises the user matching a user identifier; and
wherein the user identifier is selected from the group of user identifiers consisting of: a password and a biometric scan.

19. The non-transitory computer readable medium of claim 18, wherein determining, before execution of the child process, if one or more rules apply to the child process based on the one or more criteria comprises determining if a user associated with execution of the command to execute the child process is identified by the one or more criteria.

20. The non-transitory computer readable medium of claim 19, wherein the child process token, before modification, indicates that the user does not have permission to execute the application.

21. The non-transitory computer readable medium if claim 20, wherein the child process token, after modification, indicates that the user has permission to execute the application.

22. The non-transitory computer readable medium of claim 13, wherein determining, before execution of the child process, if one or more rules apply to the child process based on the one or more criteria comprises determining if a particular command line argument is a part of the command and modifying the child process token based on the determination.

23. The non-transitory computer readable medium of claim 13, wherein setting of the integrity level for the security parameter does not modify the integrity level of one or more other processes.

24. The non-transitory computer readable medium of claim 13, wherein determining, before the execution of the child process, if the one or more rules apply to the child process based on the one or more criteria comprises hooking the child process using a driver.

* * * * *